(12) United States Patent
Lee et al.

(10) Patent No.: US 9,936,113 B2
(45) Date of Patent: Apr. 3, 2018

(54) SMART DEVICE AND CONTROLLING METHOD THEREOF

(71) Applicant: LG Electronics Inc., Seoul (KR)

(72) Inventors: Jinsool Lee, Seoul (KR); Jongpil Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 9 days.

(21) Appl. No.: 15/004,810

(22) Filed: Jan. 22, 2016

(65) Prior Publication Data
US 2017/0078543 A1 Mar. 16, 2017

(30) Foreign Application Priority Data
Sep. 10, 2015 (KR) .................. 10-2015-0128130

(51) Int. Cl.
*H04N 5/238* (2006.01)
*H04N 5/225* (2006.01)
*G03B 9/02* (2006.01)
*G02F 1/15* (2006.01)
*H04M 1/02* (2006.01)
*H04N 5/232* (2006.01)

(52) U.S. Cl.
CPC ............ *H04N 5/2257* (2013.01); *G02F 1/15* (2013.01); *G03B 9/02* (2013.01); *H04M 1/0264* (2013.01); *H04N 5/238* (2013.01); *H04N 5/2328* (2013.01); *G02F 2001/1515* (2013.01); *H04M 2250/22* (2013.01); *H04M 2250/52* (2013.01)

(58) Field of Classification Search
CPC ...................................... H04N 5/238
USPC ........................................ 348/363
See application file for complete search history.

(56) References Cited

U.S. PATENT DOCUMENTS

| 4,526,454 A | 7/1985 | Suzuki et al. |
| 6,426,492 B1 | 7/2002 | Bos et al. |
| 8,891,042 B1 | 11/2014 | Osterman et al. |
| 2005/0146634 A1* | 7/2005 | Silverstein ............ H04N 9/045 348/360 |

(Continued)

FOREIGN PATENT DOCUMENTS

| EP | 0616242 | 9/1994 |
| JP | 2004-274548 | 9/2004 |

OTHER PUBLICATIONS

PCT International Application No. PCT/KR2016/000500, Notification of Transmittal of the International Search Report and the Written Opinion of the International Searching Authority, or Declaration dated Jul. 11, 2016, 11 pages.

(Continued)

*Primary Examiner* — Anthony J Daniels
(74) *Attorney, Agent, or Firm* — Lee, Hong, Degerman, Kang & Waimey

(57) ABSTRACT

A smart device and controlling method thereof are disclosed. The smart device includes a camera including a lens and an iris positioned over the lens, the iris including a single layer film; and a controller configured to cause the iris to adjust a size of an aperture formed in the film to adjust quantity of light incident on the lens. A method for controlling the smart device includes obtaining a video of a subject consecutively via the camera, using preset conditions; detecting a relative movement between the subject and the smart device; and adjusting at least one of the conditions based on the detected movement.

17 Claims, 26 Drawing Sheets

(56) References Cited

U.S. PATENT DOCUMENTS

| | | | |
|---|---|---|---|
| 2006/0114344 A1* | 6/2006 | Kyong | G02F 1/1334 348/296 |
| 2007/0133983 A1 | 6/2007 | Traff | |
| 2007/0242201 A1 | 10/2007 | Hyatt | |
| 2008/0259463 A1* | 10/2008 | Shepherd | G02B 3/14 359/666 |
| 2009/0128682 A1* | 5/2009 | He | G03B 3/06 348/345 |
| 2009/0204207 A1* | 8/2009 | Blum | G02C 7/08 623/4.1 |
| 2012/0008023 A1* | 1/2012 | Wajs | H04N 1/409 348/273 |
| 2012/0019713 A1 | 1/2012 | Gudlavalleti et al. | |
| 2013/0016188 A1 | 1/2013 | Ogasahara | |
| 2014/0022395 A1* | 1/2014 | Sasaki | G03B 9/02 348/175 |
| 2014/0085423 A1* | 3/2014 | Lee | H04N 13/0239 348/46 |
| 2014/0118606 A1 | 5/2014 | Sharma | |
| 2015/0163387 A1* | 6/2015 | Lee | H04N 5/238 349/2 |

OTHER PUBLICATIONS

European Patent Office Application Serial No. 16162524, Search Report dated Aug. 9, 2016, 9 pages.

* cited by examiner

SMART DEVICE AND CONTROLLING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2015-0128130, filed on Sep. 10, 2015, the contents of which are hereby incorporated by reference herein in their entirety.

BACKGROUND OF THE INVENTION

Field of the Invention

The present invention relates to a smart device and controlling method thereof, and more particularly, to a camera module of a mobile terminal or a smart device and controlling method thereof.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of contents such as videos and television programs.

In order to run such functions, a mobile terminal is basically connected to other devices or network using various communication protocols and can provide a user with ubiquitous computing environment. In particular, a mobile terminal has been evolved into a smart device that enables the connectivity to networks and the ubiquitous computing. The smart device evolving from a mobile terminal is manufactured in a traditional size for a user to hold the smart device with a hand, whereby the user carries the smart device in a manner of holding the smart device with his hand or putting the smart device in a bag or pocket. Recently, owing to the technological developments, a smart device tends to be manufactured in further smaller size and is developed into a wearable smart device directly worn on a user's body.

Meanwhile, since a smart device is conveniently portable, a user tends to frequently use a camera module of the smart device to obtain desired image information, i.e., to take photos and to make videos. Hence, the camera module of the smart device keeps being improved to have further enhanced functions. Particularly, in order to improve the quality of the obtained photo or video, like normal cameras, a camera module of a smart device is attempted to include an iris. A normal iris uses an assembly of a multitude of blades to adjust a size of an aperture configured to admit light and may have a considerable volume. However, since each of the smart device and the camera module of the smart device should have a limited size due to the required portability, a normal iris is cannot be accommodated in the camera module of the smart device. Thus, an iris needs to be improved to be optimized for the camera module of the smart device.

Moreover, if an iris is applied to a camera module of a portable smart device, various controls for improving qualities of obtained photos and videos are enabled using the iris. Hence, a control of a smart device needs to be enhanced for quality improvement.

SUMMARY OF THE INVENTION

Accordingly, embodiments of the present invention are directed to a smart device and controlling method thereof that substantially obviate one or more problems due to limitations and disadvantages of the related art.

One object of the present invention is to provide a smart device and controlling method thereof, by which a camera module having a compact configuration with enhanced functions can be provided.

Another object of the present invention is to provide a smart device and controlling method thereof, by which a quality of obtained image information can be improved.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a smart device according to one embodiment of the present invention includes a camera including a lens and an iris positioned over the lens, the iris including a single layer film; and a controller configured to cause the iris to adjust a size of an aperture formed in the film to adjust quantity of light incident on the lens.

In another aspect of the present invention, as embodied and broadly described herein, a method of controlling a smart device according to another embodiment of the present invention includes obtaining a video of a subject consecutively via a camera, using preset conditions; detecting a relative movement between the subject and the smart device; and adjusting at least one of the conditions based on the detected movement.

Accordingly, a smart device and controlling method included in the present application provide various effects and/or features as follows.

First of all, in a smart device according to the present application, an iris can adjust a size of an aperture quickly and accurately by adjusting the transparency of a film using an electrochromic material. Hence, the iris can respond to a change of an image obtained environment effectively and rapidly. Since the iris performs the adjustment of the aperture using a single-layered film only, it can have a compact size. Thus, the camera module becomes compact owning to the compact iris, thereby enabling manufacturing of a compact smart device.

Secondly, a controlling method according to the present application allows obtainment conditions in accordance with a relative movement and direct application of the adjusted conditions to an obtainment of video. The controlling method changes the obtainment conditions to remove flickers and the changed conditions can be directly applied to the obtainment of video. Therefore, the controlling method according to the present application can improve a quality of a currently obtained video actively in real time.

Effects obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

DETAILED DESCRIPTION OF THE INVENTION

Figure 1A:
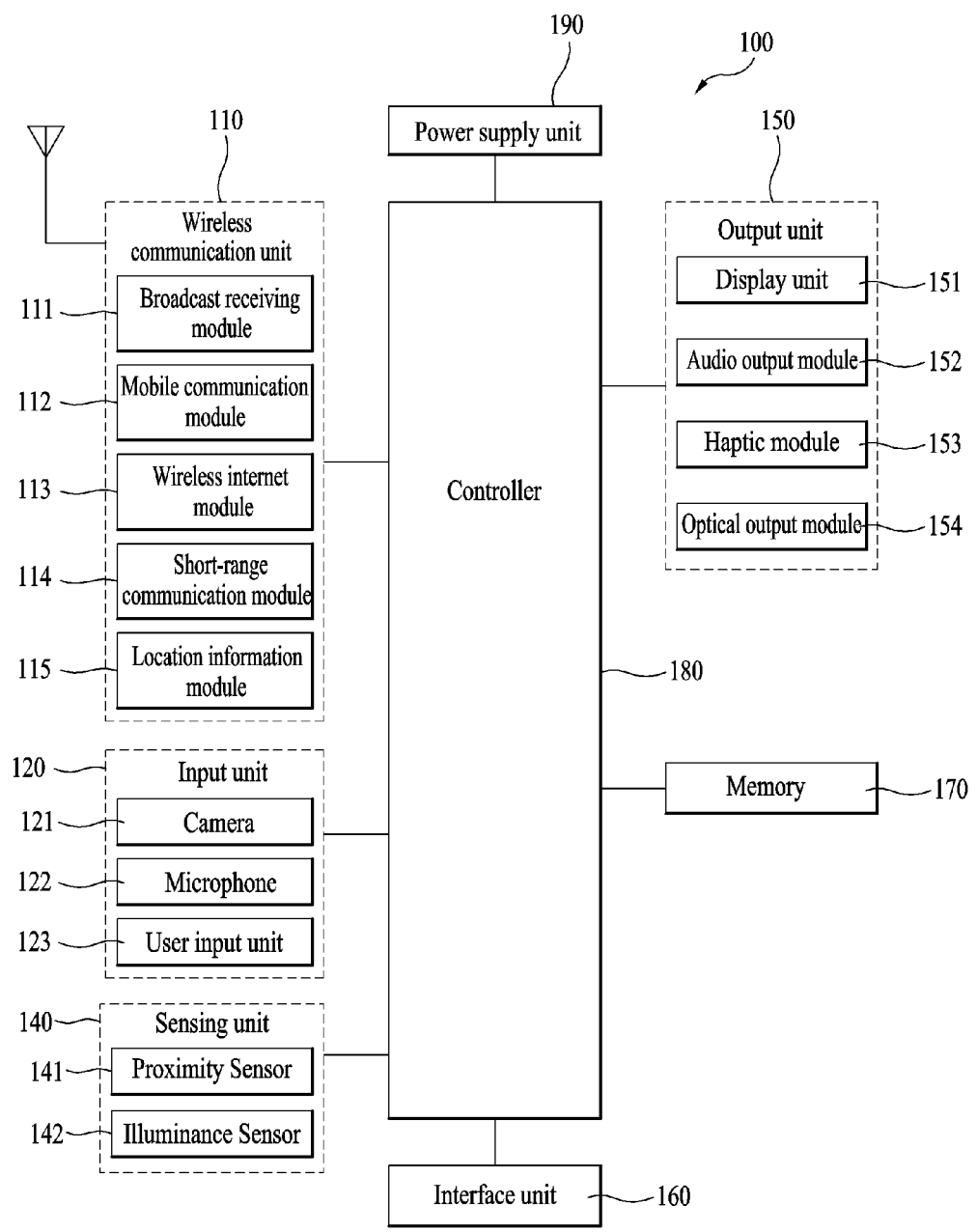
FIG. 1A is a block diagram to illustrate a configuration of an exemplary smart device described in the present application.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such a term herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present application includes a combination of features, numerals, steps, operations, components, parts and the like partially omitted from the related or involved features, numerals, steps, operations, components and parts described using the aforementioned terms unless deviating from the intentions of the disclosed original invention.

Smart devices presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like. By way of non-limiting example only, further description will be made with reference to particular types of smart devices. However, such teachings apply equally to other types of terminals, such as those types noted above. In addition, these teachings may also be applied to stationary terminals such as digital TV, desktop computers, and the like.

The overall configuration of one example of a smart device described in the present application is described with reference to the accompanying drawings as follows. FIG. 1A is a block diagram to describe a smart device related to the present application. A general configuration of the smart device is described with reference to FIG. 1A as follows.

First of all, the smart device 100 may include components such as a wireless communication unit 110, an input unit 120, a sensing unit 140, an output unit 150, an interface unit 160, a memory 170, a controller 180, a power supply unit 190, and the like. It is appreciated that implementing all of the illustrated components is not a requirement, and that greater or fewer components may alternatively be implemented. Moreover, the real shapes and structures of the aforementioned components are not illustrated all but the shapes and structures of some significant components are shown in the drawings following FIG. 1A. Yet, it is apparent to those skilled in the art that components described without being illustrated can be included in the smart device to embody the functions of the smart device.

In particular, the smart device 100 may include the wireless communication unit 110 configured with several commonly implemented components. For instance, the wireless communication unit 110 typically includes one or more components which permit wireless communication between the smart device 100 and a wireless communication system or network within which the smart device is located. The wireless communication unit 110 typically includes one or more modules which permit communications such as wireless communications between the smart device 100 and a wireless communication system, communications between the smart device 100 and another smart device 100, communications between the smart device 100 and an external server. Further, the wireless communication unit 110 typically includes one or more modules which connect the smart device 100 to one or more networks.

To facilitate such communications, the wireless communication unit 110 may include one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key (i.e., a mechanical key), etc.) for allowing a user to input information. Data (for example, audio, video, image, and the like) is obtained by the input unit 120 and may be analyzed and processed into a user's control command.

The sensing unit 140 is typically implemented using one or more sensors configured to sense internal information of the smart device, the surrounding environment of the smart device, user information, and the like. For example, the sensing unit 140 may include a proximity sensor 141 and an illumination sensor 142. If desired, the sensing unit 140 may alternatively or additionally include other types of sensors or devices, such as a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The smart device 100 disclosed in the present specification may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 may include a display unit 151, an audio output module 152, a haptic module 153, and an optical output module 154. The display unit 151 may have an inter-layered structure or an integrated structure with a touch sensor in order to facilitate a touchscreen. The touchscreen may provide an output interface between the smart device 100 and a user, as well as function as the user input unit 123 which provides an input interface between the smart device 100 and the user.

The interface unit 160 serves as an interface with various types of external devices that can be coupled to the smart device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the smart device 100 may perform assorted control functions associated with a connected external device, in response to the external device being connected to the interface unit 160.

The memory 170 is typically implemented to store data to support various functions or features of the smart device 100. For instance, the memory 170 may be configured to store application programs executed in the smart device 100, data or instructions for operations of the smart device 100, and the like. Some of these application programs may be downloaded from an external server via wireless communication. Other application programs may be installed within the smart device 100 at time of manufacturing or shipping, which is typically the case for basic functions of the smart device 100 (for example, receiving a call, placing a call, receiving a message, sending a message, and the like). It is common for application programs to be stored in the memory 170, installed on the smart device 100, and executed by the controller 180 to perform an operation (or function) for the smart device 100.

The controller 180 typically functions to control overall operation of the smart device 100, in addition to the operations associated with the application programs. The controller 180 may provide or process information or functions appropriate for a user by processing signals, data, information and the like, which are input or output by the various components depicted in the above description, or activating application programs stored in the memory 170.

Moreover, in order to launch an application program stored in the memory 170, the controller 180 can control at least one portion of the components described with reference to FIG. 1A. As one example, the controller 180 controls at least two of the components included in the smart device 100 to be activated in combination to launch the application program.

The power supply unit 190 can be configured to receive external power or provide internal power in order to supply appropriate power required for operating elements and components included in the smart device 100. The power supply unit 190 may include a battery, and the battery may be configured to be embedded in the terminal body, or configured to be detachable from the terminal body.

At least some of the components can operate cooperatively to embody the operations, controls or controlling methods of the smart device according to various embodiments mentioned in the following description. And, the operation, control or controlling method of the smart device may be embodied on the smart device by launching at least one application program saved in the memory 170.

In the following drawings, the smart device 100 is described with reference to a bar-type terminal body. However, the smart device 100 may alternatively be implemented in any of a variety of different configurations. For instance, the smart device 100 may have a wearable body such as glasses, watch, bracelet, necklace, or the like. Discussion herein will often relate to a particular type of smart device. However, such teachings with regard to a particular type of smart device will generally apply to other types of smart devices as well.

Figure 1B:
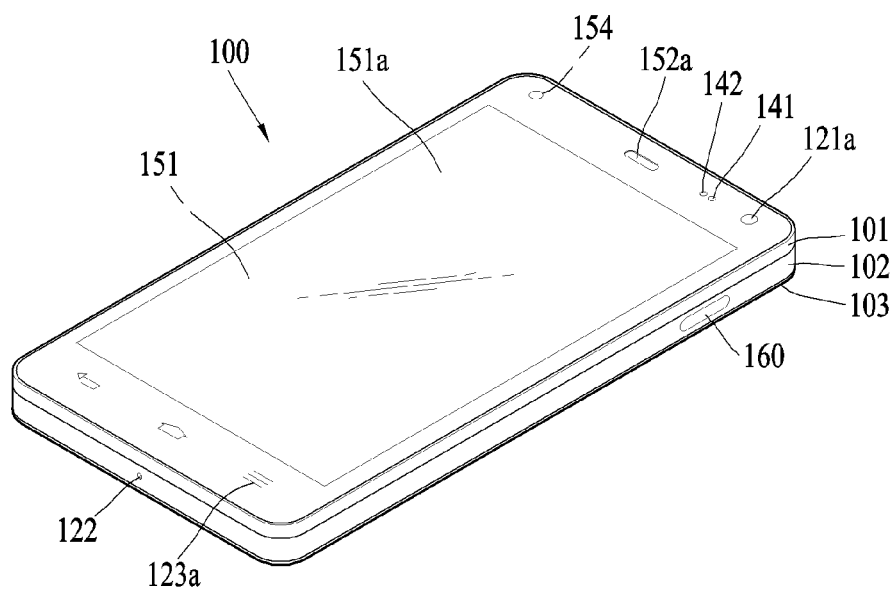
FIG. 1B and FIG. 1C are perspective diagrams for one example of a smart device viewed in different directions.
Figure 1C:
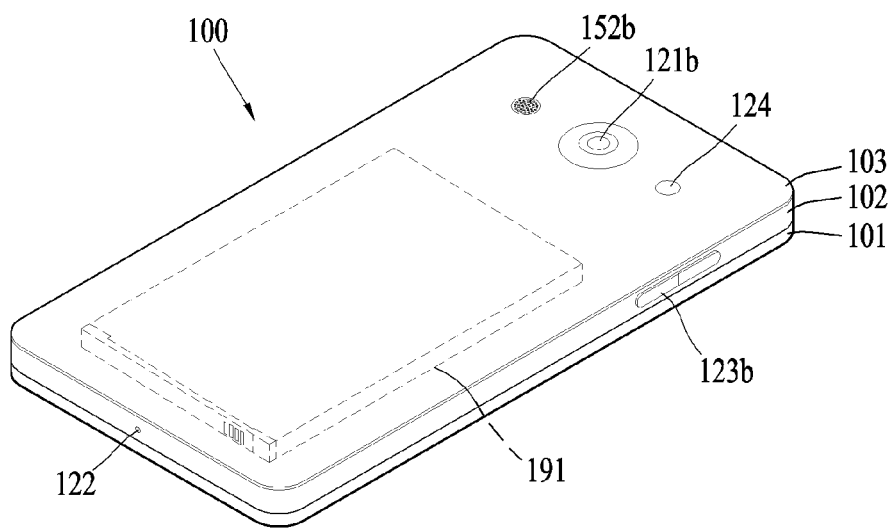

In continuation with the general configuration of the above-described smart device 100, the structure of the smart device 100 is described with reference to the accompanying drawings. FIG. 1B and FIG. 1C are perspective diagrams for one example of a smart device viewed in different directions. In particular, FIG. 1B is a perspective diagram of a front part of the smart device 100, while FIG. 1C is a perspective diagram of a rear part of the smart device 100. Since FIG. 1B and FIG. 1C show the overall structure of the smart device 100 well, all the descriptions shall refer to FIG. 1B and FIG. 1C basically unless a specific drawing to be referred to is mentioned.

As mentioned in the forgoing description, the smart device 100 has a bar-type body overall. The shape of the body is changeable in various ways. In this case, the body regards the smart device 100 as at least one assembly and may be appreciated as the concept of indicating the same. Therefore, all the components mentioned in the following description can be described as provided to the body of the smart device 100, installed in the body of the smart device 100, or included in the body of the smart device 100.

The smart device 100 generally includes a case (for example, frame, housing, cover, and the like) forming the appearance of its own. In this embodiment, as shown in the drawing, the smart device 100 may include a front case 101 and a rear case 102. Various electronic components are incorporated into a space provided by combining the front case 101 and the rear case 102 together. And, the combined cases 101 and 102 may form the appearance of the smart device 100 or an appearance of a body of the smart device 100. And, at least one middle case may be additionally positioned between the front case 101 and the rear case 102.

The display unit 151 is provided to the front side of the body of the smart device 100 to output information. As illustrated, the display unit 151 is exposed through the front case 101, thereby forming the front surface of the terminal body together with the front case 101.

In some embodiments, electronic components may also be mounted to the rear case 102. Examples of such electronic components include a detachable battery, an identification module, a memory card, and the like. Rear cover 103 is configured to cover the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output unit 152b.

The cases 101, 102 and 103 may be formed by injection-molding with synthetic resin or may be formed of a metal, for example, stainless steel (STS), aluminum (Al), titanium (Ti), or the like.

As an alternative to the example in which the plurality of cases form an inner space for accommodating components, the smart device 100 may be configured such that one case forms the inner space. In this example, a smart device 100 having a uni-body is formed in such a manner that synthetic resin or metal extends from a side surface to a rear surface.

If desired, the smart device 100 may include a waterproofing part (not shown in the drawing) for preventing water from entering the body of the smart device 100. For example, the waterproofing part may include a waterproofing member which is located between the window 151a and the front case 101, between the front case 101 and the rear case 102, or between the rear case 102 and the rear cover 103, to hermetically seal an inner space when those cases are coupled together.

The smart device 100 may include a display unit 151, a first audio output unit 152a, a second audio output unit 152b, a proximity sensor 151, an illumination sensor 142, an optical output unit 152, a first camera 121a, a second camera 121b, a first manipulating unit 123a, a second manipulating unit 123b, a microphone 122, an interface unit 160, and the like.

In the following description, as shown in FIG. 1B and FIG. 1C, the display unit 151, the first audio output unit 152a, the proximity sensor 141, the illumination sensor 142, the optical output unit 154, the first camera 121a and the first manipulating unit 123a are disposed on the front surface of the body of the smart device 100. The second manipulating unit 123b, the microphone 122 and the interface unit 160 are disposed on a lateral side of the body. The second output unit 152b and the second camera 121b are disposed on the rear surface of the body. The following description is made by taking the smart device 100 having the above-mentioned configuration as one example.

However, it is to be appreciated that alternative arrangements or dispositions are possible and within the teachings of the present disclosure. Some components may be omitted or rearranged. For example, the first manipulating unit 123a may be located on another surface of the body of the smart device 100, and the second audio output unit 152b may be located on the side surface of the body of the smart device 100.

The display unit 151 displays or outputs information processed in the smart device 100. For instance, the display unit 151 may display running screen information of an application program running in the smart device 100 or UI/GUI (user interface/graphic user interface) information according to the running screen information. When the smart device 100 is worn on a user's head using an assistant device, the display unit 151 may provide the user with 3D images for virtual reality.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 151 may include a display module (not shown in the drawing) and a window 151a configured to cover the display module. The display module may include the aforementioned display device such as LCD, OLED, or the like and is the component that actually displays image information. The window 151a may be disposed on a part of the display module exposed to a user and is able to protect the display module externally. In addition to the protective functions, the window 151 should be configured to allow the information, which is displayed on the display module, to be viewed by a user. Therefore, the window 151a may be formed of material having proper strength and transparency. The display module may be directly attached to a back surface of the window 151a. The display module can be directly attached to the window 151a in various ways. For example, an adhesive agent can be most conveniently usable for the direct attachment.

The display unit 151 may be implemented using two display devices, which can implement the same or different display technology, depending on an embodied configuration of the smart device 100. For instance, a plurality of the display units may be arranged on one side, either spaced apart from each other, or these devices may be integrated, or these devices may be arranged on different surfaces.

The display unit 151 may also include a touch sensor (not shown in the drawing) configured to sense a touch input to the display unit 151, thereby receiving an input of a control command by a touch mechanism. The touch sensor may use at least one of various touch mechanisms such as a resistance layer scheme, an electrostatic capacitance scheme, an infrared scheme, an ultrasonic scheme, a magnetic field scheme and the like. For instance, like the resistance layer scheme or the electrostatic capacitance scheme, the touch sensor can be configured to convert a variation of a pressure applied to a specific portion of the touchscreen, a variation of an electrostatic capacitance generated from a specific portion of the touchscreen, or the like into an electrical input signal. The display unit 151 may configure a touchscreen, which is a sort of a touch input device, in the smart device together with the touch sensor. The display unit 151 is able to display prescribed image information while operating as a touchscreen that is a user interface. In particular, the display unit 151 may play a role as an input unit 120 as well as an output unit 150. When a touch is applied to the display unit 151, the touch sensor may be configured to sense this touch and the controller 180 may generate a control command corresponding to the touch. The content which is inputted by the touch scheme may include a text, a numerical value (dimension), a menu item which can be indicated or designated in various modes, or the like.

The touch sensor may be configured in a form of a film having a touch pattern, disposed between the window 151a and a display module on a rear surface of the window 151a, or a metal wire which is patterned directly on the rear surface of the window 151a. Alternatively, the touch sensor may be integrally formed with the display. For example, the touch sensor may be disposed on a substrate of the display module or installed within the display module.

Thus, the display unit 151 may also form a touchscreen together with the touch sensor. In this case, the touchscreen may serve as the user input unit 123 (see FIG. 1). If necessary, a physical key (e.g., a push key) may be additionally provided as a user input unit 123 adjacent to the display unit 151 corresponding to the touchscreen to facilitate user inputs.

The first audio output unit 152a may be embodied as a receiver configured to deliver a call sound to a user's ear. And, the second audio output unit 152b may be embodied as a loud speaker configured various alarm sounds or multimedia play sounds.

A sound hole may be formed in the window 151a of the display unit 151 to discharge sound generated from the first audio output unit 152a, by which the present invention is non-limited. One alternative is to allow the sound to be released along an assembly gap between the structural bodies (for example, a gap between the window 151a and the front case 101). In this case, a hole independently formed to output audio sounds may not be seen externally or is otherwise hidden, thereby further simplifying the appearance of the smart device 100.

The optical output module 154 is configured to output light for indicating an event occurrence. Examples of such events include a message reception, a call signal reception, a missed call, an alarm, a schedule notice, an email reception, an information reception through an application, and the like. If a user's event check is detected, the controller 180 can control the optical output unit 154 to stop outputting the light.

The first camera 121a can process image frames such as still or moving images obtained by the image sensor in shot mode or video call mode. The processed image frames can be then displayed on the display unit 151 or saved in the memory 170.

The first and second manipulating units 123a and 123b are examples of the user input unit 123, which may be manipulated to receive an input of a command for controlling an operation of the smart device 100. The first and second manipulating units 123a and 123b may also be generically named a manipulating portion, and may employ any tactile manners that allow the user to perform manipulation such as touch, push, scroll, or the like with tactile sense. The first and second manipulating units 123a and 123b may also employ any non-tactile manners that allow the user to perform manipulation such as proximity touch, hovering, or the like without the tactile sense.

The present drawing illustrates that the first manipulating unit 123a is a touch key, by which the present invention is non-limited. For instance, the first manipulating unit 123a may include a push key (e.g., a mechanical key), a touch key, or a combination thereof.

Contents inputted through the first and second manipulating units 123a and 123b may be set in various ways. For example, the first manipulating unit 123a may receive an input of a command such as menu, home key, cancellation, search, or the like, and the second manipulating unit 123*b* may receive an input of a command such as a volume level adjustment of audio outputted from the first or second audio output unit 152*a* or 152*b*, a switching to a touch recognition mode of the display unit 151, or the like.

The manipulating unit 123*a*/123*b* may include a touch input device having a structure similar to that of the touchscreen applied to the display unit 151 mentioned in the foregoing description. The manipulating unit 123*a*/123*b* is configured to simply input a command without displaying the image information unlike the touchscreen. And, the touch input device applied to this manipulating unit may be called a touchpad.

For another example of the user input unit 123, a rear input unit (not shown in the drawing) may be provided to the rear surface of the body of the smart device 100. The rear input unit can be manipulated by a user to receive an input of a command for controlling an operation of the smart device 100. The inputted contents may be configured in various ways. For example, the rear input unit may receive an input such as a command for turning on/off a power, a command for start, a command for end, a command for scroll, a command for adjusting a volume of audio outputted from the first audio output unit 152*a* or the second audio output unit 152*b*, a command for switching the display unit 151 to a touch recognition mode, or the like. The rear input unit may be configured to enable a touch input, a push input, or a combination thereof.

The rear input unit may be disposed to overlap the display unit 151 of the front side in a thickness direction of the body of the smart device 100. For example, the rear input unit may be disposed on a top end portion of the rear surface of the body of the smart device 100 to facilitate a user's manipulation using a forefinger upon grabbing the body of the smart device 100 with one hand, by which the present invention is non-limited. For instance, a location of the rear input unit is changeable.

Thus, in case that the rear input unit is provided to the rear surface of the body of the smart device 100, it is able to embody a user interface of a new type using the rear input device. Moreover, as the touchscreen or rear input unit mentioned in the foregoing description replaces at least one portion of the first manipulating unit 123*a*, if the first manipulating unit 123*a* is not disposed on the front surface of the body, the display unit 151 can be configured with a larger screen.

Meanwhile, the smart device 100 may include a finger scan sensor which scans a user's fingerprint. The controller 180 can then use fingerprint information sensed by the finger scan sensor as an authentication means. The finger scan sensor may also be built in the display unit 151 or the user input unit 123.

The microphone 122 is configured to receive inputs of user's voice and other sounds. And, the microphone 122 is provided to a plurality of spots to receive an input of stereo sound.

The interface unit 160 may become a passage for connecting the smart device 100 to an external device. For example, the interface unit 160 may include at least one of a connecting terminal (e.g., USB port, etc.) for connecting to another device (e.g., an earphone, an external speaker, etc.), a port (e.g., IrDA port, Bluetooth port, Wireless LAN port, etc.) for short range communication, a power supply terminal for supplying power to the smart device 100, and the like. The interface unit 160 may be embodied in form of a socket for accommodating an external card such as Subscriber Identification Module (SIM), User Identity Module (UIM), memory card for information storage, or the like.

The second camera 121*b* may be disposed on the rear side of the body of the smart device 100. In this case, the second camera 121*b* may have a shot direction substantially opposite to that of the 1st camera 121*a*.

The second camera 121*b* may include a plurality of lenses arranged along at least one line. A plurality of the lenses may be also arranged in a matrix configuration. This camera may be called an "array camera." When the second camera 121*b* is configured with an array camera, images may be captured in various manners using a plurality of lenses and images with better qualities can be obtained. Besides, the first camera 121*a* can be configured with such an array camera as well.

A flash 124 may be disposed adjacent to the second camera 121*b*. When an image of a subject is captured by the second camera 121*b*, the flash 124 may apply light toward the subject.

The second audio output unit 152*b* can be further disposed on the body of the smart device 100. The second audio output unit 152*b* may implement a stereophonic sound function in conjunction with the first audio output unit 152*a*, and may be also used for implementing a speaker phone mode during a call.

At least one antenna for wireless communication may be provided to the body of the smart device 100. The antenna may be built in the body or formed in the case. For example, an antenna which configures a part of the broadcast receiving module 111 shown in FIG. 1A may be configured retractable into the terminal body. Alternatively, an antenna may be formed with a film and attached to an inner surface of the rear cover 103, or a case containing a conductive material may be configured to play a role as an antenna.

The power supply unit 190 (cf. FIG. 1A) configured to supply power to the smart device 100 may be provided to the body of the smart device 100, and may include a battery 191 configured externally detachable from the body.

The battery 191 may be configured to receive power via a power source cable connected to the interface unit 160. And, the battery 191 may be configured to be wirelessrechargeable through a wireless charger. The wireless charging may be implemented by magnetic induction or resonance (e.g., electromagnetic resonance, etc.).

In the present drawing, the rear cover 103 is coupled to the rear case 102 for shielding the battery 191, to prevent separation of the battery 191 and to protect the battery 191 from an external impact or foreign particles. If the battery 191 is configured detachable from the body, the rear case 103 can be detachably coupled to the rear case 102.

A circuit board can be installed in the cases 101 and 102 and is the component on which various electronic parts, and more particularly, various processors configuring the controller 180 are mounted together with other circuits and devices configured to assist the electronic parts (not shown in FIG. 1B and FIG. 1C). The respective components 110 to 190 shown in FIG. 1A are electrically connected to the circuit board to be controlled by the controller 180 in a manner of being mounted on the circuit board directly or installed on/in the cases 101 and 102. For instance, the window 151*a* (i.e., touch sensor) and the display module can be connected to the circuit board through wires despite being externally exposed. Hence, the controller 180 can be called one of various names such as a control unit, a controlling device and the like and is able to control all the components of the smart device 100. These controllable components may include other components mentioned in the following description as well as the former components shown in FIG. 1A. Therefore, the controller 180 controls operations of other components, thereby becoming an actual component capable of appropriately performing the controlling method according to the preset application mentioned in the following description. For such reasons as mentioned, all the detailed steps included in the controlling method can become the features of the controller 180.

Meanwhile, an accessory for protecting an appearance or assisting or extending the functions of the smart device 100 can be also provided to the smart device 100. For example, the accessory may include a cover or pouch for covering or accommodating at least one surface of the smart device 100. The cover or pouch may be configured to extend functionality of the smart device 100 by interworking with the display unit 151. For another example, the accessory may include a touch pen for assisting or extending a touch input to a touchscreen.

As mentioned in the foregoing description, each of the first and second cameras 121a and 121b include the digital camera and is installed as a compact module in the smart device 100. Unlike a normal camera that prints an image of a subject on a film, the digital camera module can be configured to obtain image information on an external subject basically using electronic devices. The image information may include a digital still image (i.e., a photo) or a moving image (i.e., a video). According to the detailed description of the present application in the following, the image information is simply represented as an image. And, the described image should be appreciated as including a moving image (i.e., video) as well as a still image (i.e., photo). A camera module 200 of each of the first and second cameras 121a and 121b is described in detail with reference to the accompanying drawings as follows.

Figure 2A:
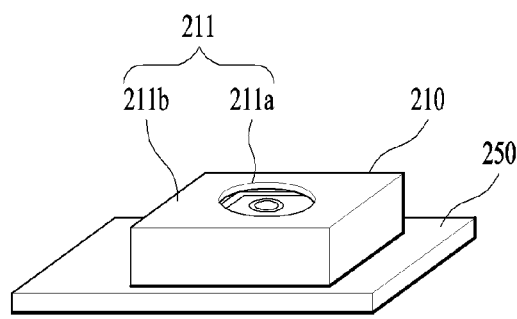
FIG. 2A is a perspective diagram for one example of a camera module of a smart device.
Figure 2B:
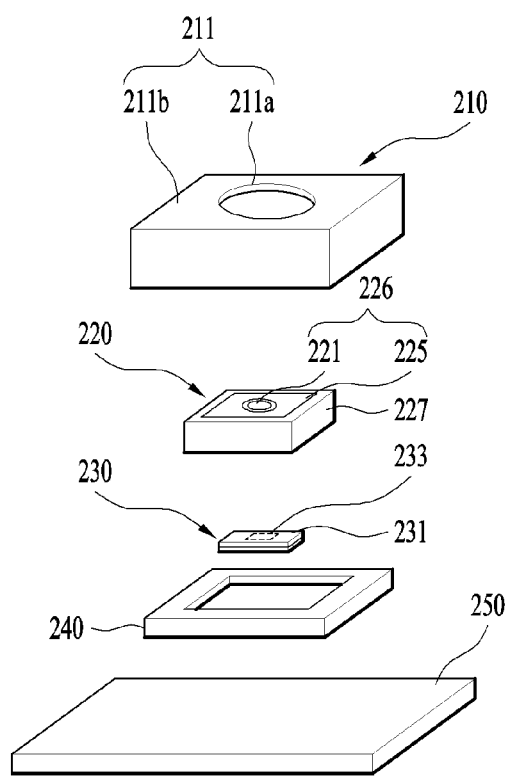
FIG. 2B is an exploded perspective diagram of the camera module shown in FIG. 2A.

FIG. 2A is a perspective diagram for one example of a camera module of a smart device, and FIG. 2B is an exploded perspective diagram of the camera module shown in FIG. 2A.

Referring to FIG. 2A and FIG. 2B, a camera module 200 according to one example of the present application may include an AF (auto focus) module 220 and a sensor module 230 to obtain a digital image. And, the camera module 200 may further include a housing 210, an OIS (optical image stabilization) driver 240, and a printed circuit board 250. The AF module 220 may include a first lens group 221, a second lens group (not shown in the drawing), an iris 225 and an AF driver 227, which will be described in detail with reference to FIG. 3A and FIG. 3B later.

The housing 210 may be installed in a body of the smart device 100. And, the housing 210 may have a configuration in a polygonal shape having a plurality of faces. In particular, the housing 210 may have a hexagonal shape, as shown in the drawing.

A first face 211 of the housing faces toward an external space of the smart device 100, and more particularly, toward a subject and may include a first region 211a and a second region 211b. The first region 211a may correspond to a region in which the AF module 220 can receive light. The first region 211a may be formed to have a size that is at least equal to or slightly greater than a diameter of each lens included in the AF module 220. Since the first region 221a should transmit light, it may be formed transparent or include an opening. The second region 211b may be configured to occupy the rest of the first face 211 by enclosing the first region 211a. Since the second region 211b may be formed non-transparent not to transmit light well. The reason for this is that if light is incident through the second region 211b, it may cause interference effect to light entering the AF module 220.

A second face (not shown in the drawing) of the housing 210 may be disposed to oppose the first face 211. In particular, a face not toward an outside of the smart device 100 but toward an inside of the smart device 100 becomes the second face. The second face may be coupled to the printed circuit board 250 provided within the smart device 100. In order to be mounted on the printed circuit board 250 arranged within the smart device 100, the housing 210 may further include a mount board (not shown in the drawing), a mount member (not shown in the drawing), and the like.

The AF module 220 is disposed adjacent to the first face 211a of the housing 210. The AF module 220 performs an auto focus function by moving an iris module 226 inside toward a center axis direction using the AF driver 227. In this case, the iris module 226 may include the first lens group 221, the second lens group (not shown in the drawing) and the iris 225.

Depending on a mechanism for generating a driving force, the AF driver 227 may be mainly classified into a VCM (voice coil motor) mechanism, a PZT (piezoelectric) mechanism, or a rotation motor mechanism. For the camera module 200 according to the present application, as shown in the drawing, the driver 227 of the PZR mechanism may be used. In this case, according to the PZT mechanism, if a voltage is applied using a piezoelectric device, a drive device is moved by a transform of the piezoelectric device.

The sensor module 230 may include an infrared (IR) filter 231 and an image sensor 233 and can be coupled to a bottom surface of the AF module 220. The IR filter 231 is disposed between the iris module 226 and the image sensor 233 and can perform a cutoff function of preventing the radiation heat, which is discharged from an external light, from being delivered to the image sensor 233. The image sensor 233 can convert an optical signal, which is incident via the AF module 220 and the IT filter 231, into an electric signal. And, the image sensor 233 may include a CCD (charge coupled device) or a CMSO (complementary metal oxide semiconductor).

The OIS (optical image stabilization) driver 240 may be coupled to the printed circuit board 250 disposed within the smart device 100. And, a module assembly of the AF module 220 and the sensor module 230 is mounted on the OIS driver 240. The OIS driver 240 performs an image stabilization function by moving the module assembly in X-axis and/or Y-axis direction set in a plane having the module assembly disposed thereon using a magnetic field. When a user takes a photo or makes a video while holding the smart device 100 with a hand or wearing the smart device 100 on a user's body, the smart device 100 may be shaken. In doing so, the OIS driver 240 (or an OIS driving unit) may vibrate the module assembly to enable an image to be automatically corrected in response to the shaking of the smart device 100 in the course of shooting. In this case, the vibration may be generated in a direction opposite to that of the shaking of the smart device 100.

Figure 3A:
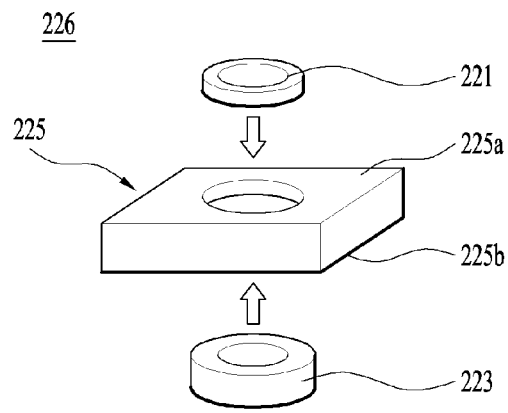
FIG. 3A and FIG. 3B are exploded perspective diagrams of an auto focus (AF) module included in a camera module.
Figure 3B:
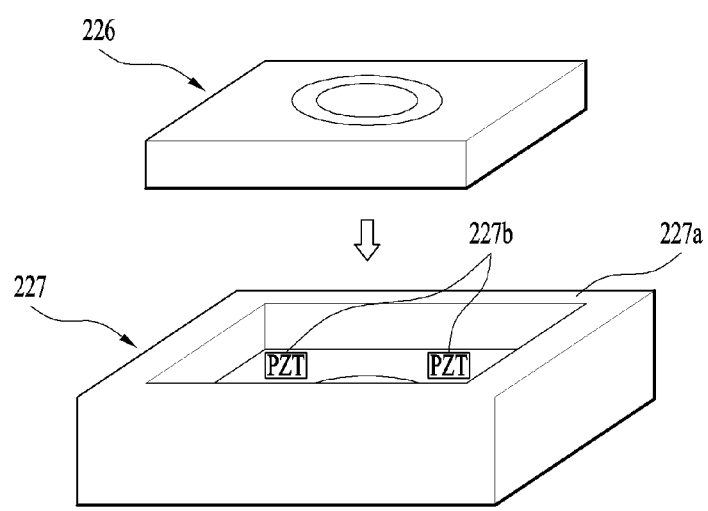
Figure 3C:
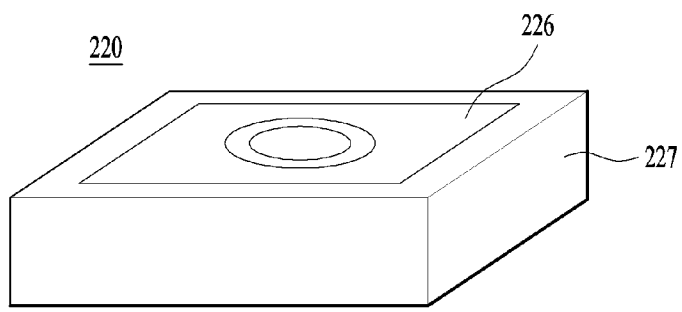
FIG. 3C is a perspective diagram of the AF module having the parts shown in FIG. 3A and FIG. 3B coupled together.

FIG. 3A and FIG. 3B are exploded perspective diagrams of an AF module included in a camera module. And, FIG. 3C is a perspective diagram of the AF module having the parts shown in FIG. 3A and FIG. 3B coupled together. The AF module 220 is described in detail with reference to the drawings as follows.

Referring to FIGS. 3A to 3C, a first lens group 221 may include a plurality of lenses and can be built in one body through a first lens barrel. A plurality of the lenses may be configured to take the focus of the light coming from a subject.

The second lens group 223 may include a plurality of lenses and can be built in one body through a second lens barrel. A plurality of the lenses can be configured to compensate for the light having passed through the first lens group 221 and an iris 225.

The iris 225 is disposed between the first lens group 221 and the second lens group 223 and can adjust a quantity of light incident on an optical system. A first opening is provided to a first face 225a of the iris 225 so that the first lens group 221 can be inserted in the first opening. The first opening may be formed to have a diameter that is equal to or slightly greater than a diameter of the first lens group 221. And, the first opening may have a shape to be firmly coupled to the first lens barrel. A second opening is provided to a second face 225b of the iris 225 so that the second lens group 223 can be inserted in the second opening. The second opening may be formed to have a diameter that is equal to or slightly greater than a diameter of the second lens group 223. And, the second opening may have a shape to be firmly coupled to the second lens barrel. Thus, it is able to configure an iris module having a one-body structure in a manner that the first lens group 221 and the second lens group 223 are inserted in the iris 225.

The AF driver 227 may include a frame 227a and a moving device 227b. The frame 227a may be configured in one of various shapes (e.g., a rectangle, etc.) to accommodate the iris module 226 therein. The moving device 227b may be disposed on the frame 227a that comes in contact with the bottom surface or second face 225b of the iris module 226. Moreover, a separate moving member (not shown in the drawing) can be additionally disposed between the iris module 226 and the moving device 227b.

The iris module 226 is inserted in the frame 227a of the AF driver 227, thereby forming an AF module 220 shown in FIG. 3C. In particular, the AF module 220 has a one-body structure in which the first lens group 221, the second lens group 223, the iris 225 and the AF driver 227 are coupled together in one body. According to the foregoing example described with reference to the corresponding drawing, the iris 225 of the AF module is disposed between the first lens group 221 and the second lens group 223. Yet, the iris 225 of the AF module 220 can be disposed right in front of the first lens group 221. On the other hand, unlike the former description, in order to have a compacter structure, the camera module 200 may have only a single lens or lens group (i.e., the second lens group 223 in the drawing) disposed between the iris 225 and the image sensor 233 without the first lens group 221. In this case, the single lens group may be configured to perform all the functions (e.g., light concentration and compensation) of the first lens group 221 and the second lens group 223. Regarding both of the aforementioned modifications, the iris 225 can be disposed closer than the lenses eventually, thereby controlling a quantity of the light incident of the lenses. Moreover, in order to have a compact structure, the iris 225 may not include a first iris and a second iris.

As the AF module 220 having the one-body structure is mounted within the smart device 100, a size of the camera module 200 can be reduced and the assembly of the camera module 200 can be facilitated. The AF module 220 can perform an auto focus function in a manner of moving the iris module 226 toward a center axis direction using the AF driver 227. In particular, the AF function is performed in a manner that the first lens group 221, the iris 225 and the second lens group 223 simultaneously move in the center axis direction. In particular, the moving device 227b of the AF driver 227 can move the iris module 226 toward the center axis direction in a manner of changing its thickness in accordance with a voltage applied to the AF driver 227 when AF operation is performed. On the other hand, according to another embodiment, the moving device 227b moves the moving member inserted in-between in a manner of changing its thickness in accordance with a voltage applied to the AF driver 227 and is able to move the iris module 226 toward the center axis direction through the movement of the moving member.

Figure 4A:
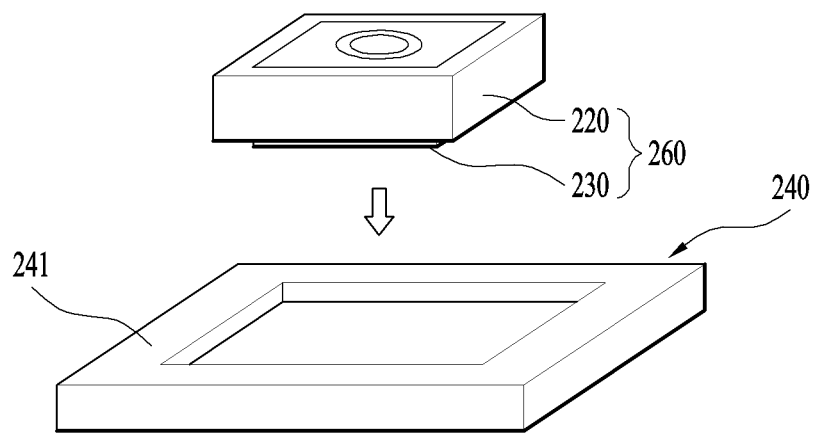
FIG. 4A and FIG. 4B are an exploded perspective diagram and a perspective diagram, respectively, of an optical image stabilization (OIS) module included in a camera module.
Figure 4B:
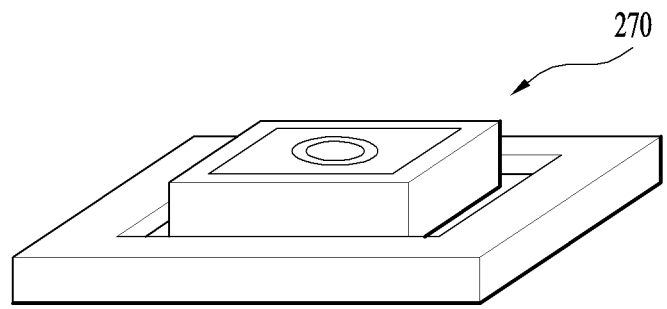

FIG. 4A and FIG. 4B are an exploded perspective diagram and a perspective diagram, respectively, of an OIS module included in a camera module. And, FIG. 5A and FIG. 5B are a perspective diagram and a schematic diagram, respectively, to illustrate an operation of the OIS module.

Referring to FIG. 4A and FIG. 4B, an OIS driver 240 may include a frame 241 and a magnetic device (not shown in the drawing). The frame 241 can be configured in one of various shapes (e.g., rectangle, etc.) in order to accommodate a module assembly 260 resulting from assembling an AF module 220 and a sensor module 230 together. The frame 241 is coupled to a printed circuit board (not shown in the drawing) disposed within a terminal (e.g., smart device). The magnetic device may be disposed on a prescribed region of the frame 241 that will come in contact with the module assembly 260. And, a separate moving member (not shown in the drawing) may be additionally disposed between the module assembly 260 and the magnetic device. As the module assembly 260 is loaded in the frame 241 of the OIS driver 240, an OIS module 270 is configured.

Figure 5A:
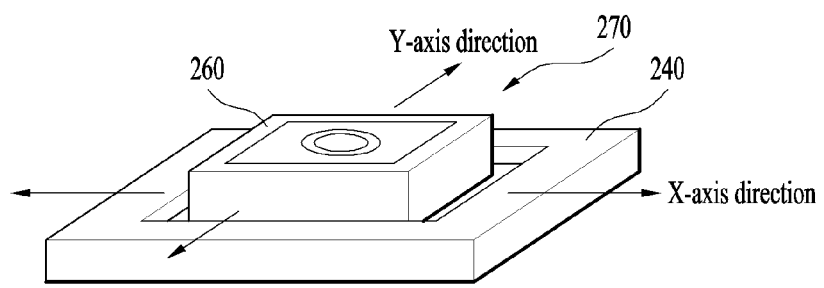
FIG. 5A and FIG. 5B are a perspective diagram and a schematic diagram, respectively, to illustrate an operation of an OIS module.
Figure 5B:
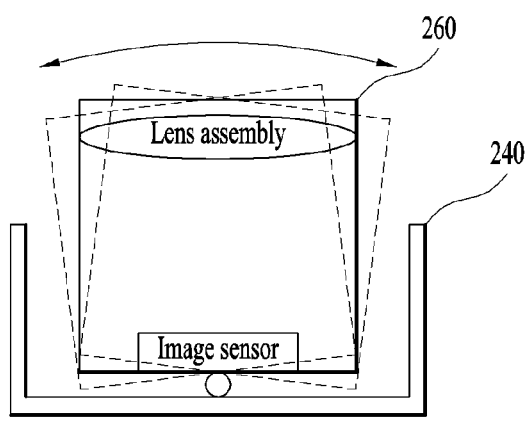

Referring to FIG. 5A and FIG. 5B, an OIS module 270 can perform an image stabilization function in a manner of moving a module assembly 260 in X-axis direction and/or Y-axis direction configured in a plane having the module assembly disposed therein simultaneously using an OIS driver 240. In particular, the image stabilization function is performed in a manner that a lens assembly and an image sensor move simultaneously. If a sensor (not shown in the drawing) configured to detect a sway by being disposed within the smart device 100 detects that the smart device 100 sways, information is delivered from the sensor. If so, current is applied to the OIS driver 240 so as to compensate for the sway of the smart device 100.

A magnetic device is able to move the module assembly 260 in X-axis direction and/or Y-axis direction by changing a magnetic field in accordance with a direction and strength of a current applied to the OIS driver 240. On the other hand, according to another embodiment, the magnetic device moves the moving member by changing a magnetic field in accordance with a direction and strength of a current applied to the OIS driver 240 and is then able to move the module assembly 260 in X-axis direction and/or Y-axis direction using a movement of the moving member. In general, the camera module 200 can perform an image stabilization function using a lens shift method of moving a lens assembly only. Moreover, in the present application, as shown in FIG. 5B, the camera module can perform an image stabilization function using a module tilt method of moving both of the lens assembly and the image sensor simultaneously.

As mentioned in the foregoing description, since all the components including the first lens group 221, the second lens group 223, the iris 225 and the AF driver 227 are assembled into a single module, the camera module 200 becomes smaller and can be installed in the smart device 100 more easily.

Figure 6:
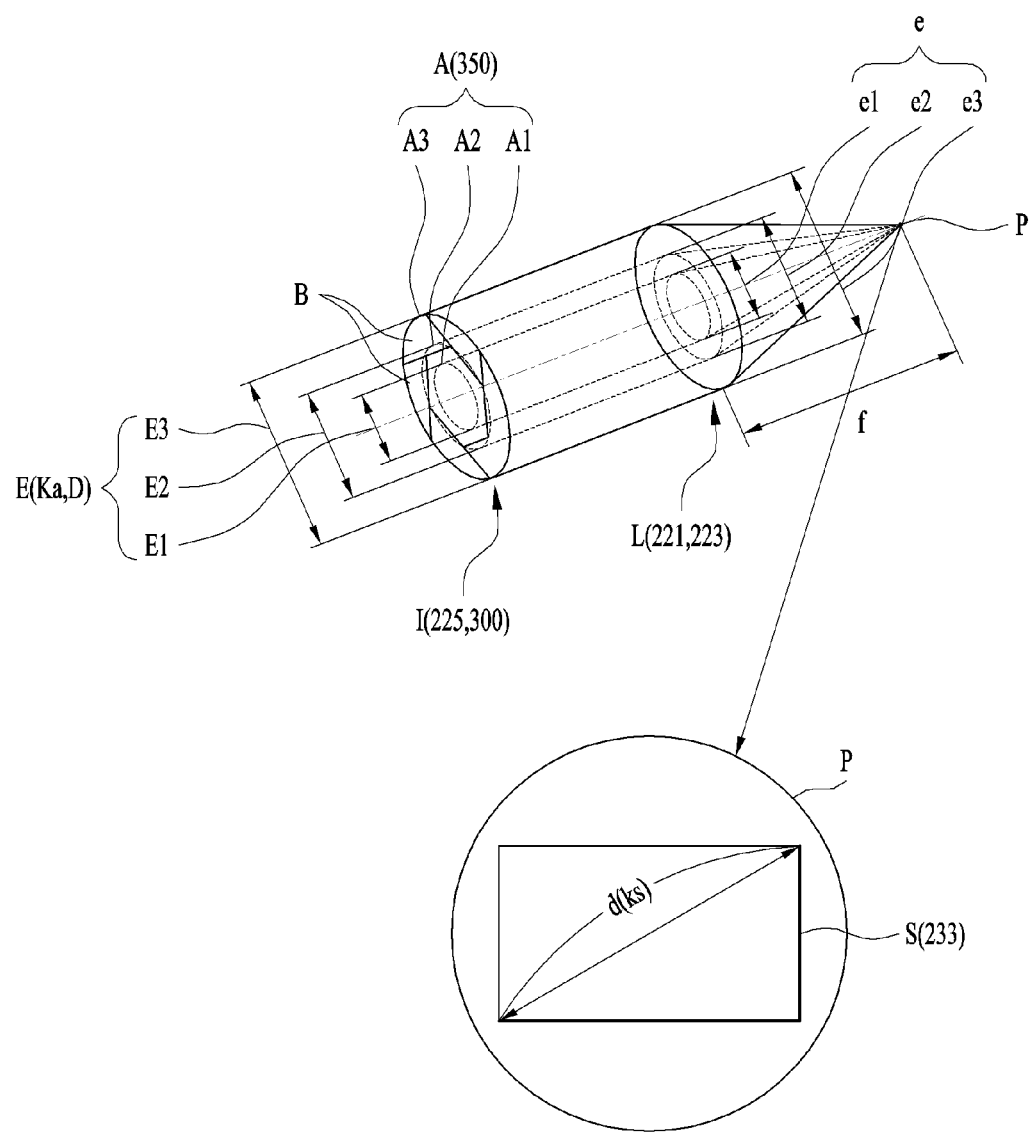
FIG. 6 is a schematic diagram to illustrate a function and operation of an iris.

Meanwhile, as schematically mentioned in the foregoing description, the camera module 200 can capture an image by the interaction between the lenses 221 and 223 and the sensor 233. In addition, the camera module 200 may include the iris 225 to assist the operations of the lenses 221 and 223 and the sensor 233. Regarding this, FIG. 6 is a schematic diagram to illustrate functions and operations of an iris, lenses and a sensor. For clarity of the description with reference to FIG. 6, the iris 225 is represented as an iris I, the sensor 233 is represented as a sensor S, and the lenses 221 and 223 are represented as a lens L. Unlike the aforementioned example, FIG. 6 shows a most typical example that the iris I is disposed closest to a subject and that the lens L is disposed between the iris I and the sensor S. Hence, the structure of the smart device 100 and a method of controlling the smart device 100 according to the present application are described based on the above disposition. Moreover, the former disposition described with reference to FIGS. 2A to 5B may apply to the smart device 100 and controlling method thereof according to the present application. For clarity of the following description, a plurality of the lenses 221 and 223 are simply denoted by a lens L only. Relations among the iris I, the lens L and the sensor S are described in detail with reference to FIG. 6 as follows.

First of all, the lens L can focus a light incident from a subject on a prescribed spot P. Hence, the sensor S having a relatively small size can convert optical information of the subject included in the focused spot P into an electrical signal. Yet, since the lens L focuses an incident light only, a quantity of the light arriving at the sensor S cannot be appropriately adjusted by the lens L. In particular, brightness around the subject directly determines the quantity of the light incident on the lens L. And, the quantity of the light incident on the lens S can directly determine the quantity of the light arriving at the sensor S. Therefore, the quantity of the light arriving at the sensor S is changed by the brightness around the subject and the brightness of an image obtained by the sensor S can be changed depending on the brightness around the subject. Since the brightness of the image has a most significant influence on a quality of the image, a simple combination of the sensor S and the lens L is unable to appropriately control a quality of the obtained image. Due to this reason, the iris I can be configured to adjust the quantity of the light incident on the lens L in the camera module 200. In particular, the iris I has an aperture A configured to allow light to pass therethrough and is able to adjust a light of the passing light, i.e., a quantity of an incident light by adjusting a size of the aperture A. For instance, the aperture A can be adjusted using one of apertures A1, A2 and A3 respectively having different diameters E1, E2 and E3. Hence, an effective diameter e of the lens L corresponding to a diameter of an actually incident light is adjusted using a prescribed one of different effective diameters e1, e2 and e3 depending on a prescribed one of the diameters E1, E2 and E3, whereby a quantity of the light incident on the lens L can be eventually adjusted. In case of obtaining an image of a subject located in a dark background, the iris I can increase the aperture A to the aperture A3 having a relatively big diameter E3, whereby a brighter image can be obtained. If a subject is located in an excessively bright background, the iris I can decrease the aperture A to the aperture A1 having a relatively small diameter E1, whereby an appropriately bright image can be obtained. Moreover, the iris I can adjust a depth of field for the same angle of field. For instance, if the aperture A of the iris I is decreased to the aperture A3, the depth of the field gets greater and a background of a subject in the obtained image, as well as the subject, can get clearer. On the other hand, if the aperture A of the iris I is increased to the aperture A1, the depth of field gets shallow. Moreover, a subject in the obtained image is clear but a background may get unclear. In particular, by adjusting the size of the aperture A of the iris I, the clarity of the background of the subject can be adjusted. Therefore, the iris I may become a core part in improving a quality of an image obtained by the camera module 200.

Yet, as shown in the drawing, a normal iris L may include an assembly of a multitude of blades B to adjust a size of an aperture A. Such a mechanical iris L has a relatively large size and is not suitable for the camera module 200 of the smart device 100, which requires a small size. Therefore, the camera module 200 according to the present application includes the iris I improved to enable a simpler and compacter structure.

Figure 7A:
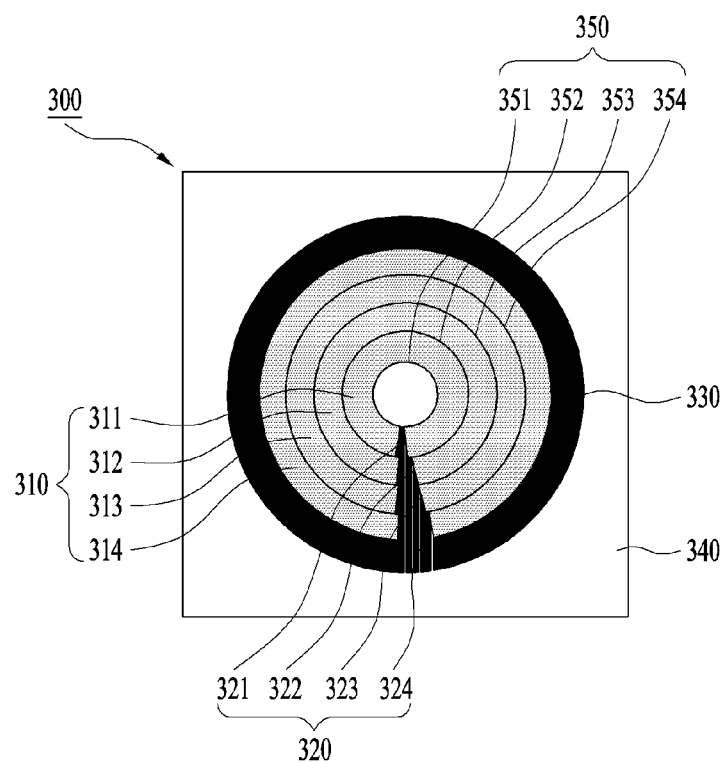
FIG. 7A and FIG. 7B are layouts of a front surface and a back surface of one example of an iris according to the present application, respectively.
Figure 7B:
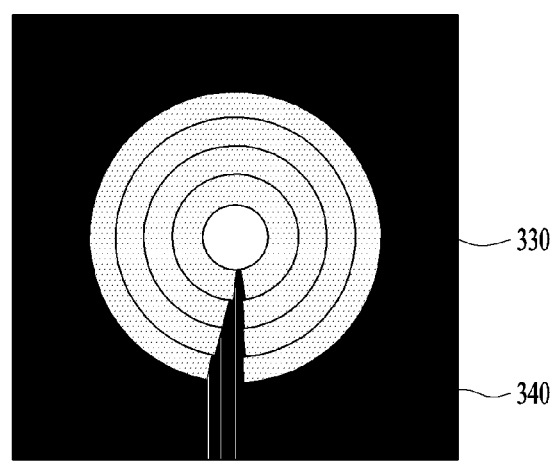
Figure 8A:
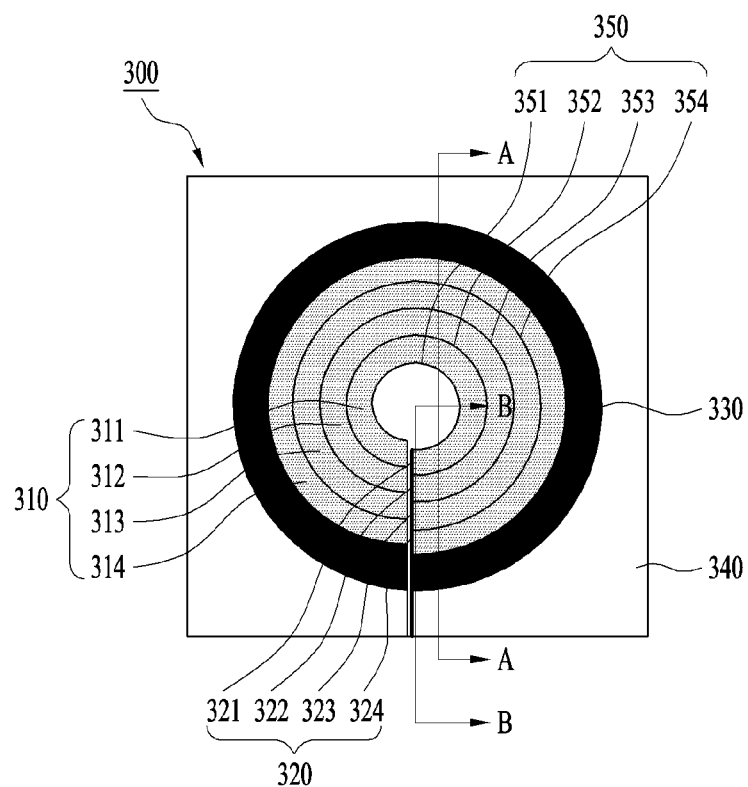
FIG. 8A and FIG. 8B are layouts of a front surface and a back surface, respectively, of a modified example of the iris shown in FIG. 7A and FIG. 7B.
Figure 8B:
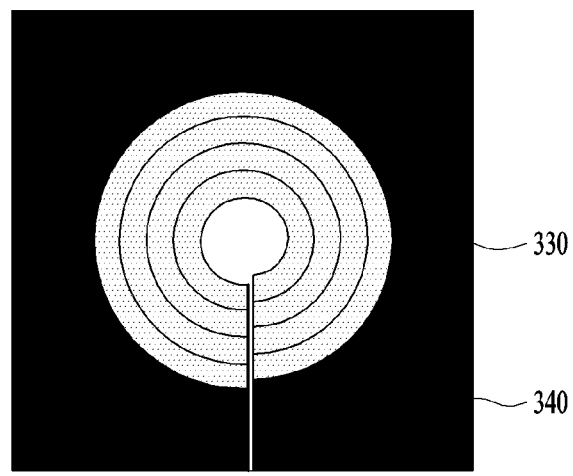
Figure 9A:
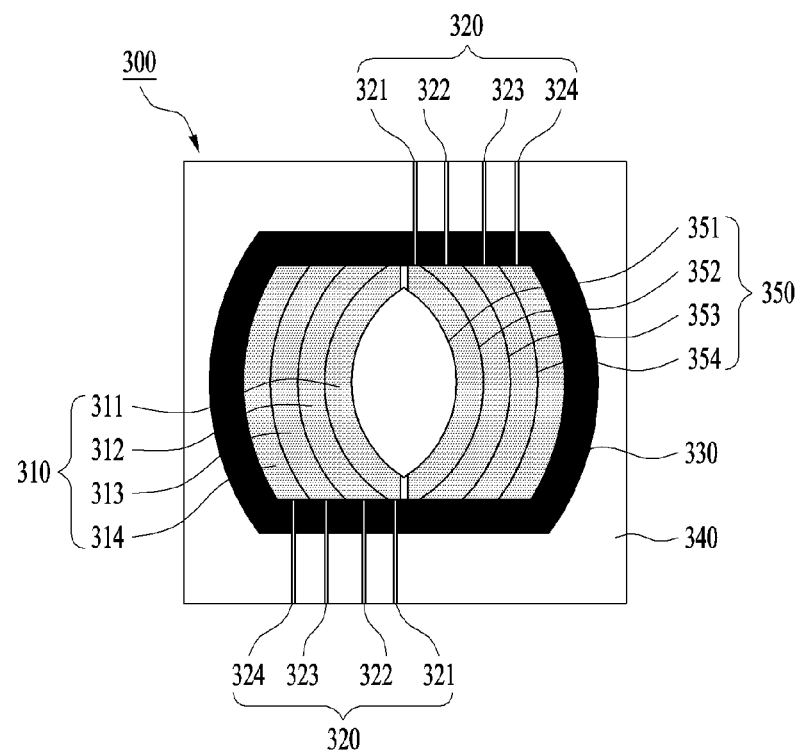
FIG. 9A and FIG. 9B are layouts of a front surface and a back surface, respectively, of one example of an iris according to an embodiment of the present application.
Figure 9B:
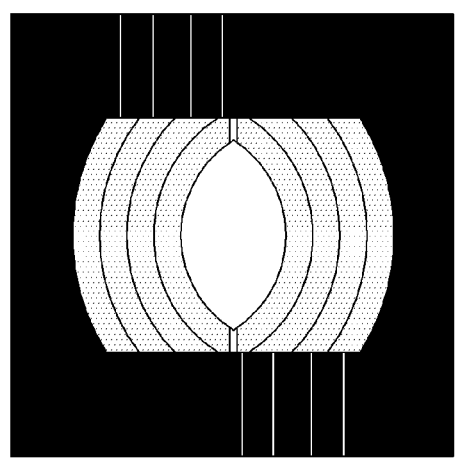
Figure 10A:
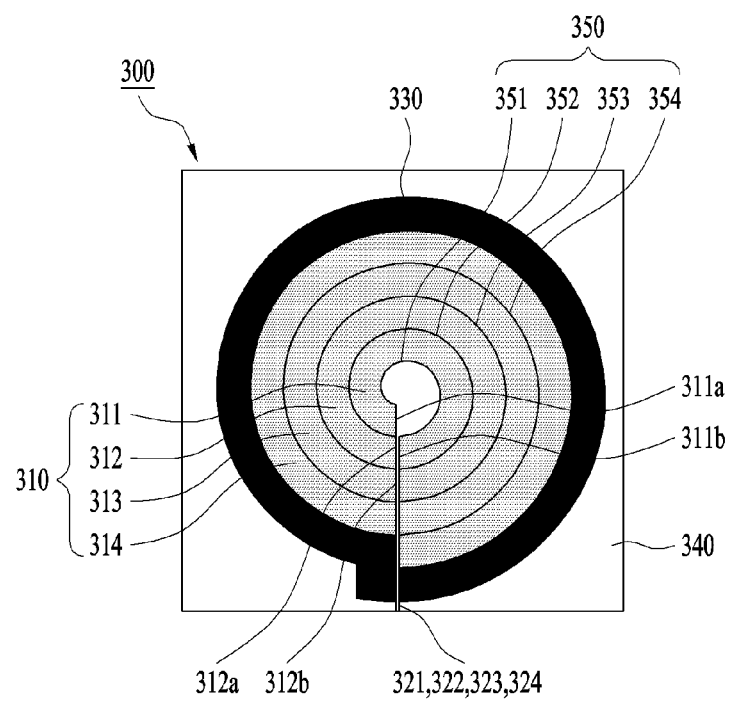
FIG. 10A and FIG. 10B are layouts of a front surface and a back surface, respectively, of one example of an iris according to an embodiment of the present application.
Figure 10B:
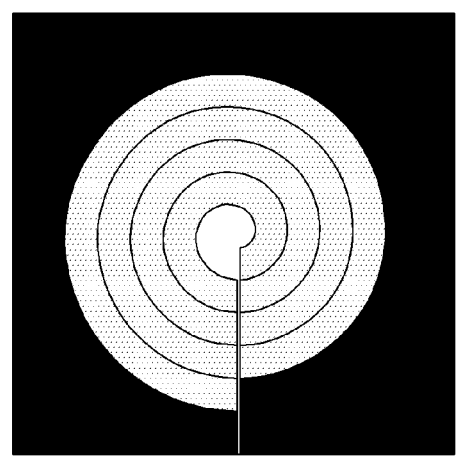

FIG. 7A and FIG. 7B are layouts of a front surface and a back surface, respectively, of one example of an iris according to the present application. FIG. 8A and FIG. 8B are layouts of a front surface and a back surface, respectively, of a modified example of the iris shown in FIG. 7A and FIG. 7B, respectively. FIG. 9A and FIG. 9B are layouts of a front surface and a back surface, respectively, of one example of an iris according to the present application. FIG. 10A and FIG. 10B are layouts of a front surface and a back surface, respectively, of one example of an iris according to the present application. An improved iris 300 is described in detail with reference to these drawings as follows.

Referring to FIGS. 7A to 10B, an iris 300 may include a film 310 having a prescribed thickness. The film 310 can form an aperture 350 configured to allow light to pass and is able to adjust a size of the aperture 350. In particular, as the film 310 is included, the iris 300 can be substantially configured to adjust the size of the aperture 350. Since the size of the aperture 350 is adjusted to control a quantity of a light incident on a lens, the film 310 can actually form a plurality of apertures 351 to 354 differing from each other in their sizes. In particular, the iris 300 can be configured to form the apertures having different sizes in the film 310. Since the film 310 performs most of significant functions of the iris 300, the features of the film 310 can be regarded as the features of the iris 300. Therefore, it is appreciated that all the features of the film 310 in the detailed description of the present application can be described as the features of the iris 300 as well. Similarly, although a prescribed feature is described as a feature of the iris 300, if it is related to the film 310, it may be described as the feature of the film 310.

In particular, although a size of the aperture 350 of the film 310 may be adjusted in various ways, the iris 300 can partially adjust a transparency of the film 310 in order to adjust a size of the aperture 350. For instance, regarding the iris 300, if a portion of the film 310 is formed transparent and the rest is formed non-transparent, the transparent portion can form the aperture 350 configured to allow light to pass. And, by enlarging or reducing the transparent portion, it is able to adjust the size of the aperture 350. Moreover, a transparency of the film 310 can be adjusted in various ways. According to the present application, in order to adjust the transparency of the film 310, the iris 300 can partially change a color of the film 310 by electricity or electric charges. In particular, a color of a portion of the film 310 can be reversely changed by electricity in order to adjust transparency. In particular, for this electrochromic change, the film 310 can be formed of electrochromic material. If a voltage is applied to the electrochromic material, the electrochromic material can be switched to a non-transparent state from a transparent state. If a voltage is not applied to the electrochromic material, the electrochromic material can be switched to the transparent state from the non-transparent state. The electrochromic material may be representatively formed on PEDOT (poly(3,4-ethylenedioxythiophene)). Moreover, the electrochromic material may be formed of $LiCF_3SO_3$.

In case that the film 310 consists of a single member made of an electrochromic material, the iris 300 can obtain the aperture 350 of a desired size by changing or varying the transparency of the film 310 continuously. In particular, by the continuous transparency adjustment, a size of the aperture 350 can be finely adjusted. Yet, it may be difficult to actually control a size of an applied voltage and a voltage applied portion in order to change the transparency continuously. Therefore, the iris 300 may include a multitude of films 311 to 314 having apertures 351 to 354, respectively, the apertures 351 to 354 differing from each other in their respective sizes. Meanwhile, since the films 311 to 314 actually correspond to a part of the film 310, the film 310 can be described as including the films 311 to 314. For such a reason as mentioned, the features of the films 311 to 314 can be described and regarded as the features of the film 310 and the aperture 350. By controlling a multitude of the films 311 to 314 individually, the apertures 351 to 354 can be formed more easily and conveniently.

Since the films 311 to 314 include the apertures 351 to 354 differing from each other in their respective sizes, as shown in the drawing, the films 311 to 314 can be disposed concentrically. Owing to the concentric disposition, the films 311 to 314 may occupy a small space and the iris 300 itself may become compact. The concentric disposition may include a pair of films (e.g., films 312 and 313 shown in FIG. 7A) disposed adjacent to each other, which can be appreciated well from the relation between a pair of the films. One 312 of a pair of the films 312 and 313 may be disposed within the aperture 353, which is formed larger than the aperture 352 of the film 312, of the other 313. In particular, the former film 312 can be enclosed by the latter film 313 having the aperture 353 that is larger than the aperture 352 of the former film 312.

Figure 11:
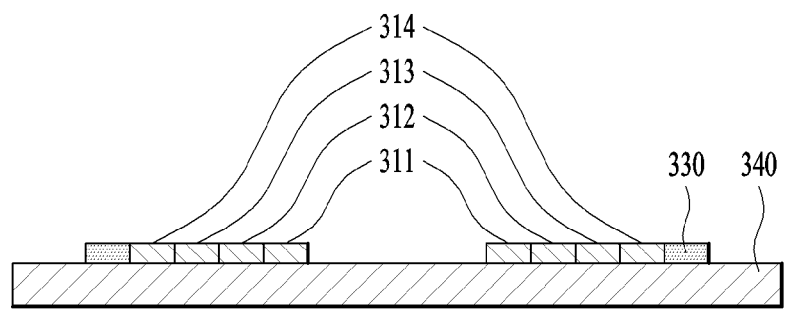
FIG. 11 is a cross-sectional diagram obtained along a line A-A shown in FIG. 8A to illustrate arrangement of films of an iris.

Furthermore, if a multitude of the films 311 to 314 are disposed in a single layer, it is able to reduce a thickness of the iris 300. Therefore, for a more compact iris 300, a multitude of the films 311 to 314 can form a single layer. Such a disposition is shown well in FIG. 11 that is a cross-sectional diagram obtained along a line A-A shown in FIG. 8A to illustrate the disposition of the films 311 to 314 of the iris 300. Referring to FIG. 11, all of a multitude of the films 311 to 314 can be substantially disposed in the same plane. Owing to the disposition in the same plane, the films 311 to 314 (i.e., the film 310) may be formed of a single layer only. Moreover, since the film 310, i.e., the films 311 to 314, have the reduced thickness, the iris 300 can additionally include a layer containing the films 311 to 314. Since such a multitude of the layers can form more apertures 350 differing from each other in size, the iris 300 can adjust the size of the aperture 350 more finely.

Eventually, when the film 310 of the iris 300 has a multitude of the films 311 to 314, the films 311 to 314 have the apertures 351 to 354, respectively, having different sizes. The films 311 to 314 can be concentrically disposed in the same plane while forming a single layer. Moreover, insulating layers (not shown in the drawing) may be disposed between the above-configured films 311 to 314. Hence, the films 311 to 314 can be electrically insulated from each other by the insulating layers. Alternatively, clearances may be formed between the films 311 and 314 instead of the insulating layers. Hence, the electrical insulation can be provided by such clearances. The real structure of a plurality of the films 311 to 314 can be appreciated well by referring to the examples shown in FIGS. 7A to 10B. According to the examples shown in FIGS. 7A to 10B, four films 311 to 314 are disposed in the same plane by forming four concentric circles. Moreover, FIGS. 7A to 10B show the non-transparent films 311 to 314 only. Furthermore, for better understanding, FIGS. 13A to 13D can be referred to for the following description.

According to the actual examples shown in FIGS. 7A to 10B, the iris 300 may include the first film 311 having the first aperture 351 and the second film 312 having the second aperture 352 by enclosing the first film 311. The first aperture 351 has a prescribed first diameter D1 and the second aperture 352 may have a second diameter D2 that is greater than the first diameter D1. The first film 311 may be disposed in the second aperture 352. Moreover, the iris 300 may include the third film 313 having the third aperture 353 by enclosing the second film 312 and the fourth film 314 having the fourth aperture 354 by enclosing the third film 313. The third aperture 353 has a third diameter D3 that is greater than the second diameter D2. And, the fourth aperture 354 has a fourth diameter D4 that is greater than the third diameter D3. The second film 312 may be disposed in the third aperture 353. And, the third film 313 may be disposed in the fourth aperture 354. According to the actual example shown in the drawing, the iris 300 includes 4 films. If necessary, the iris 300 can have more or less than 4 films.

Regarding operations of a multitude of the films 311 to 314, in order to have the apertures 351 to 354 differing from each other in their respective sizes, the iris 300 can be configured to adjust the transparencies of the films 311 to 314 individually. Moreover, in order to adjust the transparencies of the films 311 to 314, the iris 300 can selectively change the colors of the films 311 to 314 using electricity (e.g., voltage, electric charges, etc.). In particular, the transparencies of the films 311 to 314 can be individually adjusted to form the apertures 351 to 354 differing from each other in their respective sizes. And, the colors of the films 311 to 314 can be selectively changed by electricity (e.g., voltage, electric charges, etc.) for adjustments of the transparencies. In more particular, in order to form a predetermined aperture (e.g., the third aperture 353), the iris 300 can transparentize the films 311 and 312 having the apertures 351 and 352, each of which is smaller than the predetermined aperture 353. In order to form the third aperture 353, the iris 300 can transparentize the film 313 having a predetermined aperture (e.g., the third aperture 353) and the film 314 having the aperture 354 that is greater than the predetermined aperture 353. As mentioned in the foregoing description, in order to transparentize the films 311 and 312, voltage may not be applied to the films 311 and 312. In order to non-transparentize the films 313 and 314, voltage may be applied to the films 313 and 314. Since the films 311 and 312 are disposed in the predetermined aperture (e.g., the third aperture 353), if the films 311 and 312 are transparentized, the third aperture 353 can be formed to allow light to pass through the lens by the relatively non-transparent films 313 and 314.

FIGS. 13A to 13D are layouts to show an actual operation of an iris. And, the operation of the iris 300 can be better appreciated with reference to these drawings.

Figure 13A:
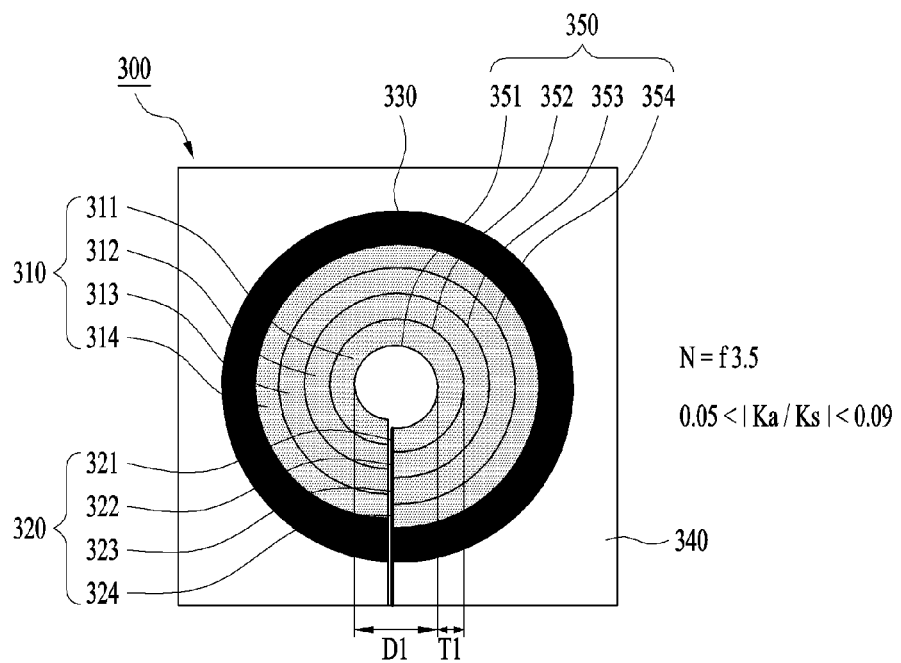
FIGS. 13A to 13D are layouts to show an operation of an iris and characteristic values obtained from the operation.
Figure 13B:
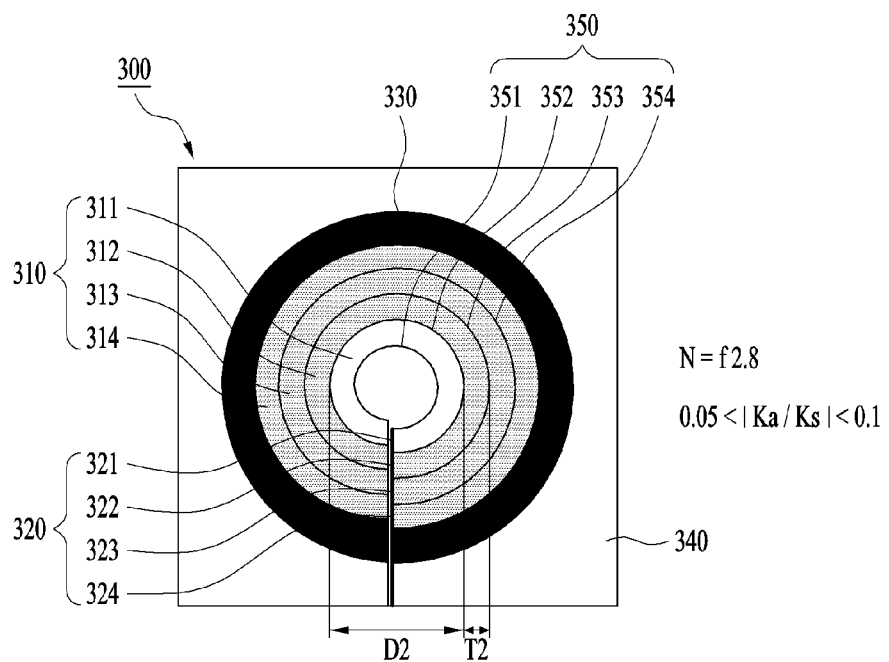
Figure 13C:
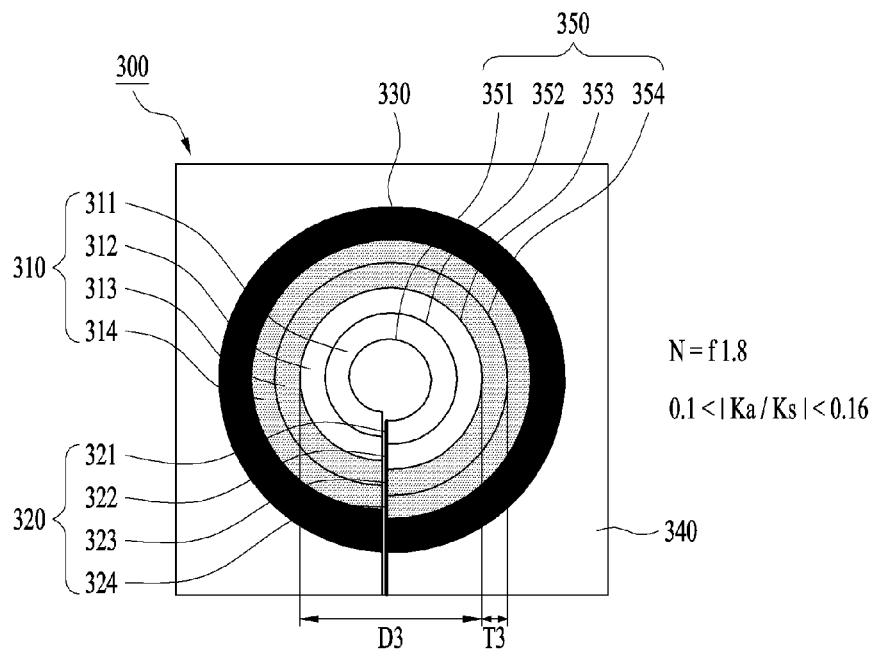
Figure 13D:
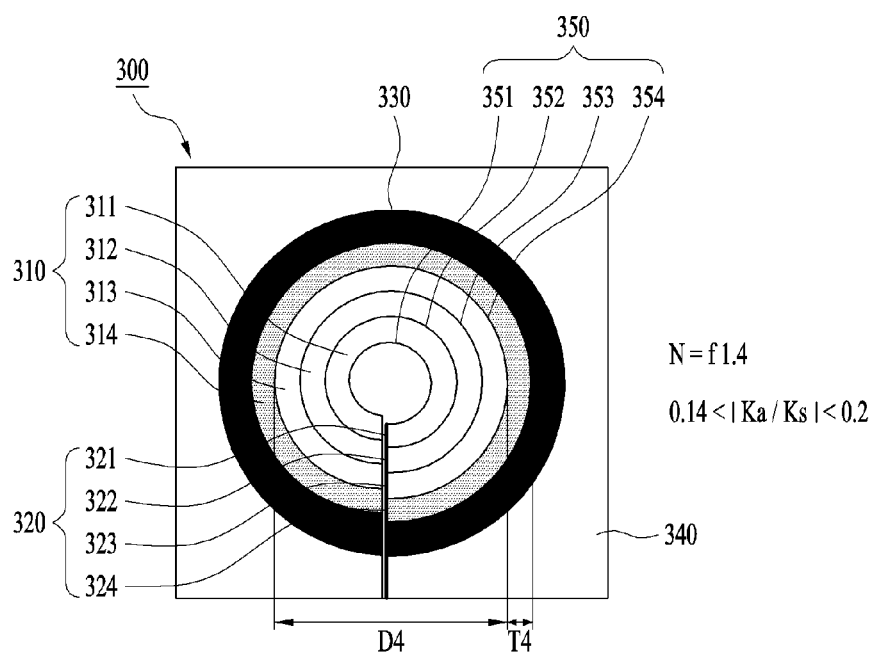

Referring to FIG. 13A, if voltage is applied to all of first to fourth films 311 to 314, the films 311 to 314 can be non-transparentized. Therefore, by the non-transparent films 311 to 314, the iris 300 or the film 310 can form a first aperture 351 having a first diameter D1. Moreover, referring to FIG. 13B, as a voltage is applied, the second to fourth films 312 to 314 are non-transparentized. Yet, as a voltage is not applied, the first film 311 can be transparentized. Hence, by the non-transparent films 312 to 314, the iris 300 or the film 310 can form a second aperture 352 having a second diameter D2. Referring to FIG. 13C, as a voltage is applied, the third and fourth films 313 and 314 are non-transparentized. Yet, as a voltage is not applied, the first and second films 311 and 312 can be transparentized. Hence, by the non-transparent third and fourth films 313 and 314, the iris 300 or the film 310 can form a third aperture 353 having a third diameter D3. Finally, as a voltage is applied, the fourth film 314 is non-transparentized. Yet, as a voltage is not applied, the first to third films 311 to 313 can be transparentized. Hence, by the non-transparent fourth film 314, the iris 300 or the film 310 can form a fourth aperture 354 having a fourth diameter D4. According to the operation of the actual example, color and transparency are selectively changed in each of the films 311 to 314, and more particularly, in a prescribed portion of the film 310. Hence, the different apertures 351 to 354 can be formed. Hence, as discussed in the foregoing description, when a multitude of the films 311 to 314 are included, the iris 300 partially adjusts a transparency of the film 310 to adjust a size of the aperture 350. For such a transparency adjustment, it can be appreciated that a color of a portion of the film 310 is partially changed.

In continuation with the overall structure and operation mentioned in the foregoing description, detailed features of the iris 300 are described in the following. For description of the detailed features of the iris 300, FIGS. 7A to 10B are referred to again as well as FIG. 6.

Referring to FIG. 6, a shape of a light incident on the lens L is determined depending on a shape of the aperture A. And, a light finally arriving at the sensor S, i.e., a spot P can have the same shape despite having a small size. As shown in the partially enlarged diagram of the sensor S shown in FIG. 6, the sensor S can detect an image as an electrical signal from the focused spot P if a size of the focused spot P is enough to fully cover the sensor S. Hence, a shape of the aperture A may not be considerably limited. Owing to the concentric disposition of the films 311 to 314, the shape of the aperture A may be similar to a shape of the films 311 to 314. For such a reason as mentioned, like the shape of the aperture A, the shape of the films 311 to 314 can be designed without considerable limitation.

As mentioned in the foregoing description, if the spot P has a size detectable by the sensor S, the aperture A can have one of any shapes such as a circular shape and the like. Therefore, as shown in FIGS. 7A to 8B, each of the films 311 to 314 may have a substantially circular shape. Hence, in accordance with a concentric disposition, i.e., a disposition of one film adjacent to an aperture of another film, the apertures 351 to 354 can have substantially circular shapes. Moreover, referring to FIG. 9A and FIG. 9B, the films 311 to 314 may have a parenthesis shape. By these films 311 to 314, apertures 351 to 354 having substantially oval shapes can be formed, whereby the focused spot P can be well detected by the sensor S. Since the films 313 and 314 of the parenthesis shape are divided into two parts, they can be formed more easily than the films 313 and 314 including a single body of a circular shape shown in FIGS. 7A to 8B. Hence, productivity can be improved. Moreover, referring to FIG. 10A and FIG. 10B, the iris 300 can include a multitude of films 311 to 314 extending spirally. The films 311 to 314 shown in FIG. 10A and FIG. 10B include all the structural features of the aforementioned former films and may further include additional features attributed to the spiral shape. In particular, the iris 300 can have the first film 311 spirally extending from a first end portion 311a to a second end portion 311b to form an aperture 351 having a prescribed first diameter D1 for example. Moreover, the iris 300 can include the second film 312 spirally extending from a first end portion 312a, which is spaced apart in a circumferential direction from the second end portion 311b, to a second end portion 312b by enclosing the first film 311 to form an aperture 352 having a second diameter D2 greater than the first diameter D1. Subsequently, the third film 313 and the fourth film 314 can be described in the same manner of the second film 312.

The iris 300 can also include a substrate 340 configured to support the film 310 or the films 311 to 314. The film 310 or the films 311 to 314 can be coated on the substrate 340. Since the aperture 350 or the apertures 351 to 354 are formed on the substrate 340, the substrate 340 should transmit light like the aperture 350 or the apertures 351 to 354. Hence, the substrate 340 can be formed of a transparent material such as glass, transparent plastics, or the like. If a light enters the lens L through another portion of the iris 300 other than the aperture 350, it may interfere with a light entering the lens L through the aperture 350 to degrade a quality of an obtained image. Therefore, the iris 300 may include a non-transparent layer 330 configured to prevent light from entering the lens through a portion other than the aperture 350. The non-transparent layer 330 can be formed on the substrate 340 like the film 310 in a manner of enclosing an outer circumference of the film 350, and more particularly, a most outer circumference of the film 350. Moreover, as shown in FIGS. 7A, 8A, 9A and 10A, the non-transparent layer 330 may have a ring shape that encloses the outer circumference of the film 310. The non-transparent layer 330 of the ring shape can effectively prevent light leakage using less material. On the other hand, referring to FIGS. 7B, 8B, 9B and 10B, the no-transparent layer 330 may be formed over a whole surface of the substrate 340 except a surface having the film 350 formed thereon. The non-transparent layer 330 may be advantageous in preventing the light leakage almost perfectly. The aperture 350 can selectively use one of the partially non-transparent layer 330 shown in FIGS. 7A, 8A, 9A and 10A and the fully non-transparent layer 330 shown in FIGS. 7B, 8B, 9B and 10B.

As mentioned in the foregoing description, the electrochromic material is used for the adjustment of a transparency of the film 310 and may require that a voltage needs to be applied for the color change. Therefore, the iris 300 may include an electrode 320 configured to apply a voltage to the film 310. In order to apply a voltage, the electrode 320 can be connected to an external power source and the film 310. As mentioned in the foregoing description, since the iris 300 can include a multitude of the films 311 to 314, the iris 300 can include a multitude of electrodes (i.e., first to fourth electrodes 321 to 324) connected to the films 311 to 314, respectively. Hence, using the electrodes 321 to 324, the iris 300 can individually control the transparency of each of the films 311 to 314.

The electrodes 321 to 324 are concentrically disposed. Hence, when two films are disposed adjacent to each other, a film relatively disposed outside can enclose a film relatively disposed inside. If the films 311 to 314 have a continuously formed body, an electrode connected to the film disposed inside (e.g., the first electrode 321) can be connected to the second to fourth films 312 to 314 enclosing the first film 311 in order to be connected to an external power source. Hence, if a voltage is applied through the first electrode 321, the voltage is applied to the second to fourth films 312 to 314 as well so that the iris 300 may operate incorrectly. Due to this reason, referring to FIGS. 7A to 10B, each of the films 311 to 314 becomes discontinuous at least at one point. In particular, each of the films 311 to 314 is disconnected at at least one point so as to be open to form a clearance at the at least one point. Hence, the electrodes 321 to 324 can reach the corresponding films 311 to 314 through the above-formed clearances and can be connected thereto, respectively. In particular, referring to FIG. 7A and FIG. 7B, the electrodes 321 to 324 can be disposed in the same plane and may also be disposed in the same plane of the films 311 to 314. Moreover, as shown in the drawings, the electrodes 321 to 324 in the same plane can be spaced apart from each other not to interfere with each other electrically. Referring to FIG. 9A and FIG. 9B, each of films 311 to 314 has a parenthesis shape and is divided into two parts. Hence, each of electrodes 321 to 324 can be connected to the two parts. For instance, in case of the fourth film 314, the fourth electrode 324 can be connected to the two parts of the fourth film 314. Like the former electrodes described with reference to FIG. 7A and FIG. 7B, the electrodes 321 to 324 shown in FIG. 9A and FIG. 9B are spaced apart from each other and can be disposed in the same plane.

Figure 12:
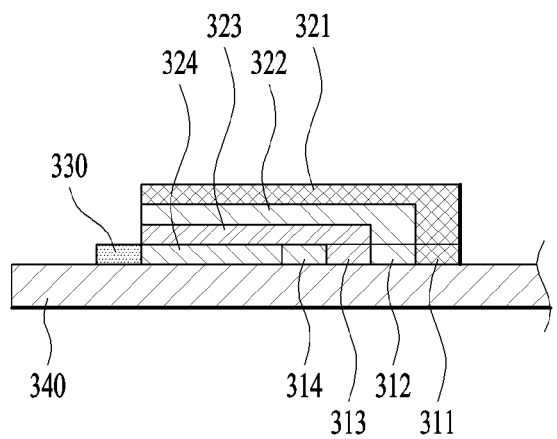
FIG. 12 is a cross-sectional diagram obtained along a line B-B shown in FIG. 8A to illustrate arrangement of electrodes of an iris.

The aforementioned electrodes 321 to 324 in the same plane can apply voltages to the films 311 to 314, respectively, while maintaining the iris 300 compact. Yet, referring to FIG. 7A and FIG. 7B, a big clearance is required in order to dispose a multitude of electrodes 321 to 324 in the same plane of the films 311 to 314. Hence, a shape of the aperture 350 becomes a non-circular shape and a light leakage may possibly occur. To prevent this, referring to FIGS. 8A, 8B, 10A and 10B, the electrodes 321 to 324 can be sequentially stacked on each other. The stacked electrodes 321 to 324 are shown in FIG. 12 that is a cross-sectional diagram obtained along the electrode shown in FIG. 8A, and more particularly, along a line B-B. As shown in the drawing, the third electrode 323, the second electrode 322 and the first electrode 321 can be stacked on the fourth electrode 324, the third electrode 323 and the second electrode 322, respectively. Since the stacked electrodes 321 to 324 do not occupy a considerable space, the clearance formed in the films 311 to 314 can be reduced. Therefore, the aperture 350 can have a circular shape and the light leakage can be prevented. Moreover, insulating layers (not shown in the drawings) may be disposed between the stacked electrodes 321 to 324. For instance, the insulating layers can be disposed between the first electrode 321 and the second electrode 322, between the second electrode 322 and the third electrode 323, and between the third electrode 323 and the fourth electrode 324, respectively. Therefore, although electrical interference is generated, the insulating layers can clearly exclude the electrical interference from the electrodes 321 to 324.

Meanwhile, as mentioned in the foregoing description, the iris 300 may have influence on the properties of the camera module 200 in determining a quality of an obtained image. The iris 300 can be designed in detail by considering these properties, whereby the camera module 200 can obtain an image of a better quality. Therefore, values of significant properties in an actual design of the iris 300 and dimensions (i.e., numerical values of design) of the iris 300 determined by the property values are described in detail as follows.

First of all, as mentioned in the foregoing description with reference to FIG. 6, the lens L focuses a light incident through the iris 300 on a single spot P. And, the sensor S can obtain an image as an electrical signal from the spot P. In such an optical system operation, a diameter E of the aperture A of the iris 300 can determine a quantity of a light incident on the lens L, i.e., an affective diameter e of the aperture A. Moreover, as shown in the drawing, the spot P should have a size capable of overlapping with the sensor S to obtain an appropriate electrical signal from the sensor S. Since the sensor S normally has a rectangular shape, the spot P needs to have a diameter corresponding to a diagonal length d of the sensor S. Hence, the diameters E and e of the aperture and the lens may be closely associated with the diagonal length d. Due to such a reason, considering the above-described mutual relations of the optical system, a rate of the diameter E of the aperture A over the diagonal length d of the sensor S may become a most basic property in the design of the camera module 200. The lens L of the camera module 200 may have F-number as a property of indicating a brightness of the lens L. Regarding the F-number N, $N=f/e$, where a focal distance of the lens L is f and an effective diameter of the lens L is e. Moreover, the F-number N can be actually denoted by fN or f/N (where, N is F number). Since the focal distance f of the lens L in the normal camera module 200 is fixed, the F-number may be determined by the effective diameter e. Moreover, since the effective diameter e is equal to the diameter E of the aperture A, the F-number may be inversely proportional to the diameter E finally. In particular, if a size of the aperture A increases, the F-number decreases and a depth of field may become shallow. On the other hand, if a size of the aperture A decreases, the F-number increases and a depth of field may become deep. Since the F-number has a direct influence on a brightness of an obtained image, it may become a significant property of the aperture 300 as well.

In particular, each of the rate and the F-number includes the diameter E of the aperture A as a variable. Hence, the rate and the F-number have interconnectivity and can be considered together for the design. In particular, when the aperture 300 is designed, values of the rate and the F-number can be determined together. For instance, referring to FIG. 13A, for the first aperture 351, the F-number N can be set to f3.5. For the first aperture 351, the rate (Ka/Ks) of the diameter E of the aperture over the diagonal length d of the sensor can have a range of $0.05 < |Ka/Ks| < 0.09$, where Ka indicates the diameter E of the aperture A and Ks indicates the diagonal length d of the sensor S configured to convert the optical information of the light having passed through the lens L into an electrical information. Referring to FIG. 13B, for the second aperture 352, the F-number N can be set to f2.8 and the rate (Ka/Ks) can have a range of $0.05 < |Ka/Ks| < 0.1$. Referring to FIG. 13C, for the third aperture 353, the F-number N can be set to f1.8 and the rate (Ka/Ks) can have a range of $0.1 < |Ka/Ks| < 0.16$. Finally, referring to FIG. 13D, for the fourth aperture 354, the F-number N can be set to f1.4 and the rate (Ka/Ks) can have a range of $0.14 < |Ka/Ks| < 0.2$. Considering these property values, the rate Ka/Ks can have a range of $0.05 < |Ka/Ks| < 0.2$ and the F-number N can have a range between 1.4 and 3.5. Therefore, as values of the appropriate rate Ka/Ks and the F-number N included in the above-mentioned ranges are necessarily selected and then applied to the designs of the iris 300 and the camera module 200. Owing to the designs, an image obtained by the camera module 200 can have a desired quality.

Moreover, actual numerical values (dimensions) of the iris 300 can be designed from the ranges of the property values. Generally, sensors S having 3 sizes can be applied to the camera module 200. In particular, a 13-mega pixels sensor S can have a diagonal length (Ks, d) of 5.867 mm, a 16-mega pixels sensor S can have a diagonal length (Ks, d) of 6.864 mm, and a 21-mega pixels sensor S can have a diagonal length (Ks, d) of 7.870 mm. As a real diagonal length Ks is given, a diameter (Ka, E) of a real aperture can be obtained from a value of the rate Ka/Ks for each aperture. Moreover, as shown in the drawing, owing to the concentric disposition, the films 311 to 314 consist of a strip disposed to form an aperture in a prescribed shape. Hence, prescribed distances exist between the inner circumferences forming the apertures 351 to 354 and the outer circumferences spaced apart from the inner circumferences. And, as shown in FIGS. 13A to 13D, these distances may actually correspond to widths of the films 311 to 314, and more particularly, to first to fourth widths T1 to T4. These widths T1 to T4 can become the significant dimensions of the iris 300 like the diameter (E, Ka), i.e., the diameters D1 to D4 shown in FIGS. 13A to 13D. Considering the concentric disposition of the films 311 to 314, the widths T1 to T4 can be obtained from the diameters D1 to D4, respectively.

For instance, referring to FIG. 13A, for the first aperture 351, the first diameter D1 may be set to 0.46 mm-0.49 mm and the first width T1 may be set to 0.001 mm-0.07 mm. Referring to FIG. 13B, for the second aperture 352, the second diameter D2 may be set to 0.58 mm-0.61 mm and the second width T2 may be set to 0.001 mm-0.27 mm. Referring to FIG. 13C, for the third aperture 353, the third diameter D3 may be set to 0.9 mm-0.91 mm and the third width T3 may be set to 0.001 mm-0.22 mm. Finally, Referring to FIG. 13D, for the fourth aperture 354, the fourth diameter D4 may be set to 1.15 mm-1.17 mm and the fourth width T4 may be set to 0.001 mm-0.25 mm. Considering the real dimensions, the diameter D of the aperture 350 can have a range between 0.46 mm and 1.17 mm and the width T may have a range between 0.001 mm and 0.27 mm. Therefore, as appropriate dimensions included in the above-mentioned ranges are necessarily selected and then applied to the designs of the iris 300 and the camera module 200. Owing to the designs, an image obtained by the camera module 200 can have a desired quality.

Considering the former descriptions and drawings, the iris 300 can adjust the size of the aperture 350 quickly and accurately by the transparency adjustment of the film 310 using the electrochromic material. Hence, the iris 300 can have a high response to a change of an image obtained environment. Since the iris 300 performs the adjustment of the aperture 350 using the film 310 formed of a single layer only, it can have a compact size. Therefore, the camera module 200 can become compact by the compact iris 300. Furthermore, the smart device 100 can become compact as well.

Meanwhile, the object of providing a camera module having improved functions with a compact structure can be primarily achieved by the aforementioned iris 100. In order to achieve an additional technical object, i.e., a quality improvement of an obtained image more specifically, it is necessary to be supported by an appropriate control in consideration of the structure and property of the iris 300. Moreover, in implementing functions of the smart device 100, interactions with a user are basically accompanied. Hence, through optimization of various controls including a user environment and a user interface of a user, the above-mentioned technical object can be achieved more effectively and efficiently. Furthermore, user experiences (e.g., use facilitation, use convenience, etc.) for the smart device 100 can be remarkably improved. For such reasons as mentioned, the method of controlling the smart device 100 shown in FIGS. 1A to 13D is developed. And, the following description is made with reference to the accompanying drawings in addition to FIGS. 1A to 13D. The former descriptions with reference to FIGS. 1A to 13D are basically included in and referred to by the following descriptions and drawings of a controlling method.

Figure 14:
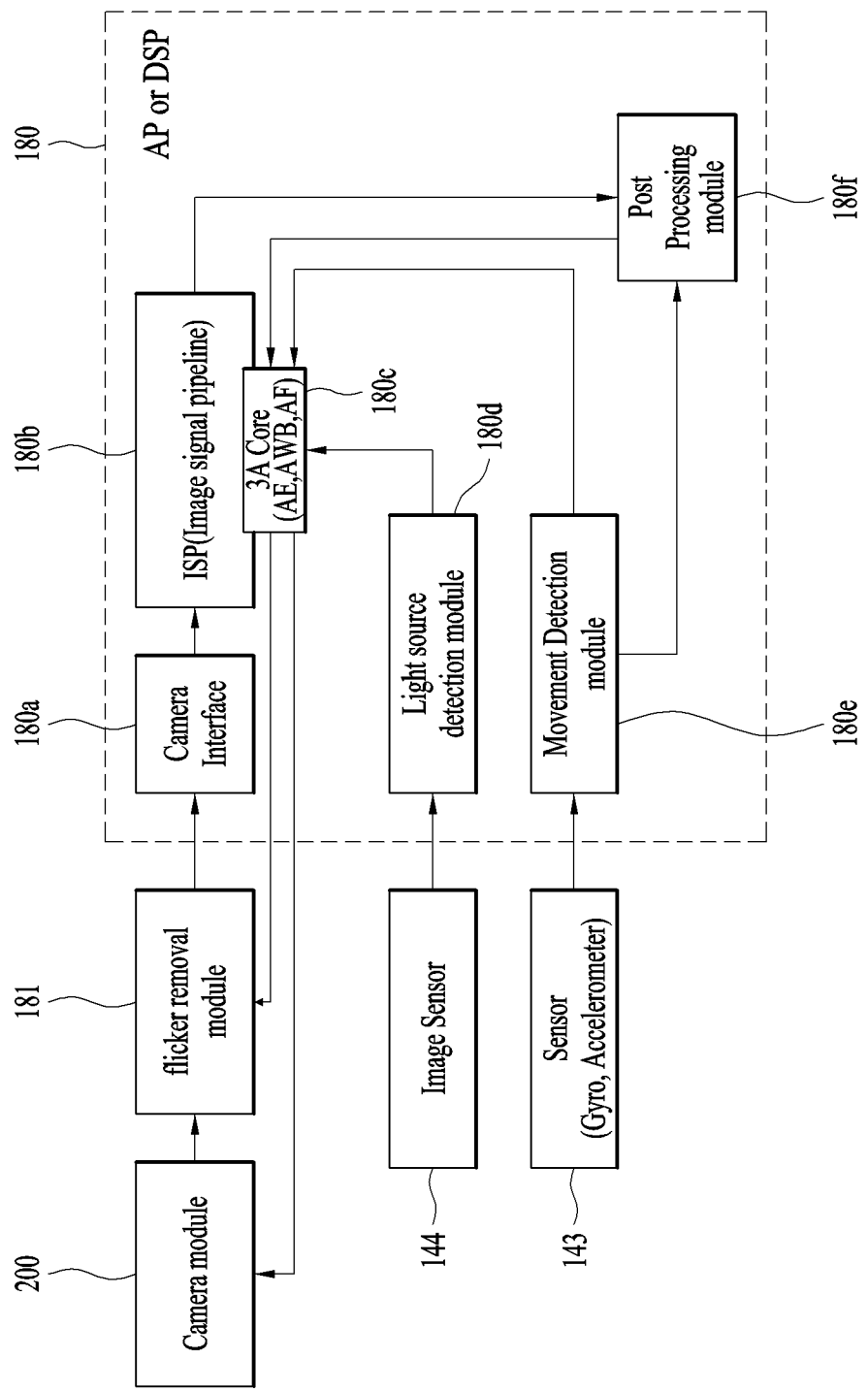
FIG. 14 is a block diagram of a partial configuration of a smart device related to a controlling method described in the present application.
Figure 15:
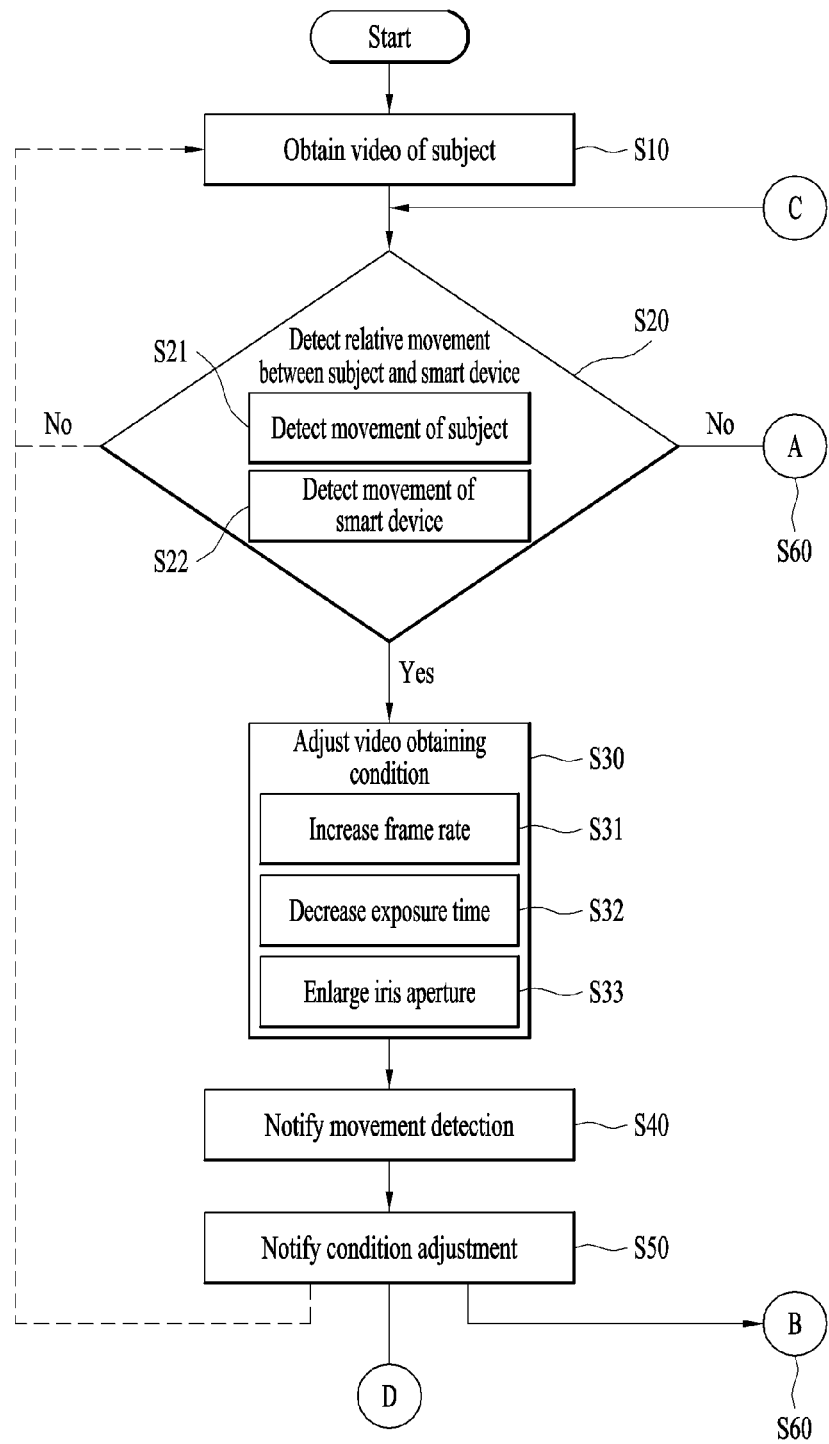
FIG. 15 is a flowchart of a method of controlling a smart device described in the present application.

FIG. 14 is a block diagram of a partial configuration of a smart device related to a controlling method described in the present application. And, FIG. 15 is a flowchart of a method of controlling a smart device described in the present application. FIG. 14 shows details of configurations of the smart device 100 designed to actually implement the controlling method shown in FIG. 15. Hence, the configurations shown in FIG. 14 are edited for clarity of the controlling method description and correspond to a portion of the aforementioned configurations shown in FIG. 1A.

Referring to FIG. 14, the smart device 100 can include the camera module 200 for implementation of the controlling method according to the present application. As the camera module 200 has been described in detail already, its description shall be omitted. The smart device 100 may include an external image sensor 144 and a gyroscope and acceleration sensor 143. The image sensor 144 is the sensor additionally provided to the image sensor 233 in the camera module 200. The image sensor 144 can obtain an image of high resolution for a subject and can be used for various usages. For instance, through an image analysis of the obtained high-resolution image, a movement detection of the subject or an augmented reality can be provided. The gyroscope and acceleration sensor 143 is installed in the smart device 100 and is able to detect a movement of the smart device 100 itself by detecting variations of gravity and acceleration.

The smart device 100 may include a processor as the controller 180. The processor corresponds to one of various processors included in the controller 180 and may be specialized for the image processing. For instance, the process or 180 may include an AP (application processor) or a DSP (digital signal processor). The processor 180 may include a camera interface module 180a configured to connect the camera module 200 and the processor 180 to each other. An ISP (image signal pipeline) module 180b of the processor 180 can perform various processings on an obtained raw image. For instance, the ISP module 180b may include a 3A core module 180c. And, the module 180c can perform AE (auto exposure), AWB (auto white balance) and AF (auto focus) on the obtained image. A light source detection module 180d is able to determine a type of a light source using an electrical signal obtained from the external image sensor 144. And, a movement detection module 180e can detect a movement of the device 100 using a signal obtained from the external sensor 143. Operations of the light source detection module 180d and the movement detection module 180e shall be described in detail later. A post processing module 180f performs an additional processing on the image processed by the ISP module 180b and 180c and is able to perform image stabilization on an obtained image. A flicker removal module 181 is configured to remove a fading generated from an obtained image or video, which will be described later. Although the flicker removal module 181 is shown as a separate chipset in FIG. 14, it may be built in one body of the processor 180.

An image obtained from the camera module 200 may be processed by the ISP module 180b and the post processing module 180f via the interface 180a. Moreover, the information used for the processing in the modules 180b and 180f may be fed back to the removal module 181 or the camera module 200 to adjust or change the obtainment conditions for the improvement of a quality of an obtained image. For such a reason as mentioned, the results from the detection modules 180*d* and 180*e* may be fed back to the removal module 181 or the camera module 200 via the ISP module 180*b* and the core modules 180*b* and 180*c*.

Figure 21:
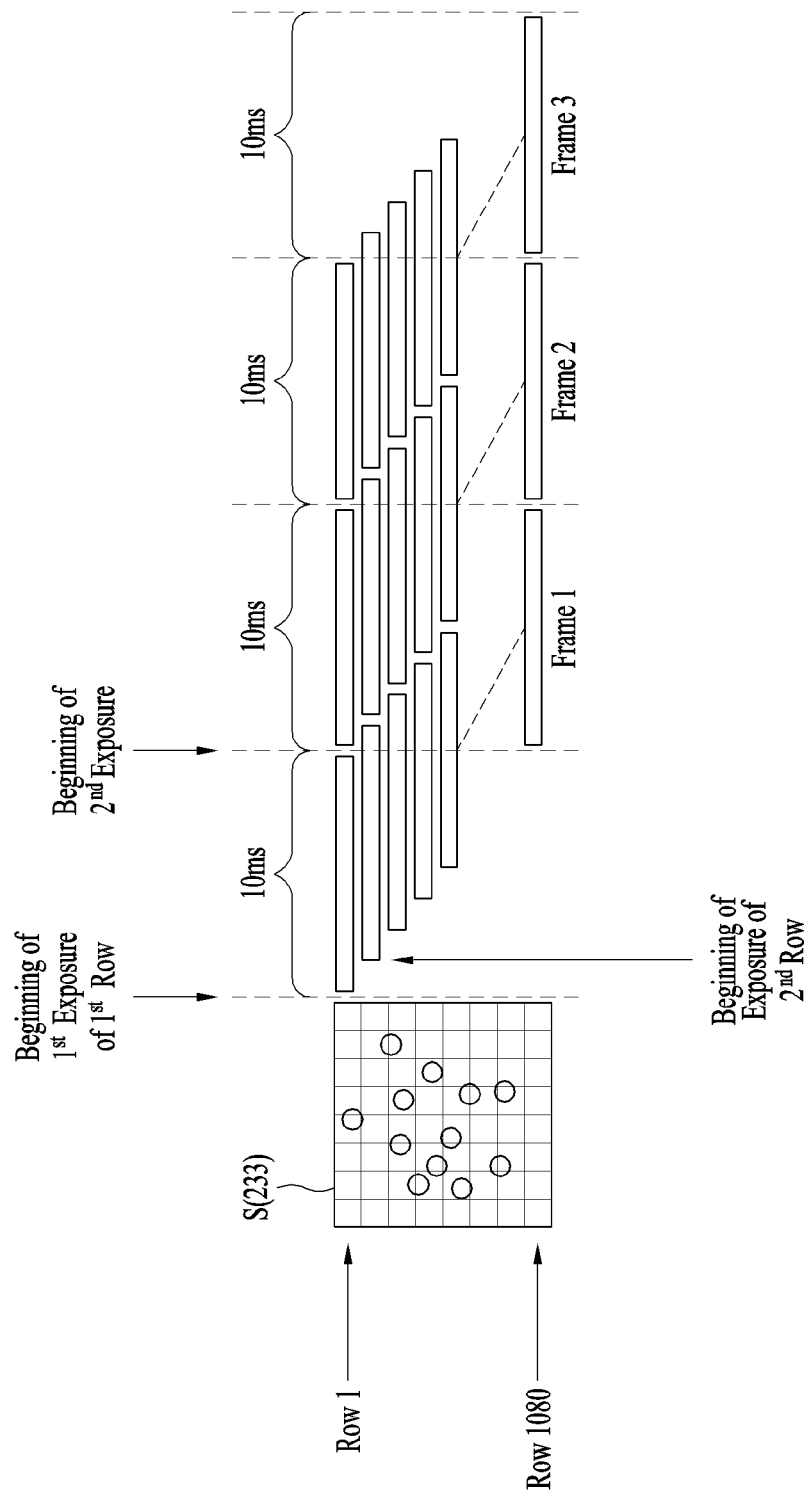
FIG. 21 is a schematic diagram of a process for obtaining a frame in an image sensor of a camera module.
Figure 22:
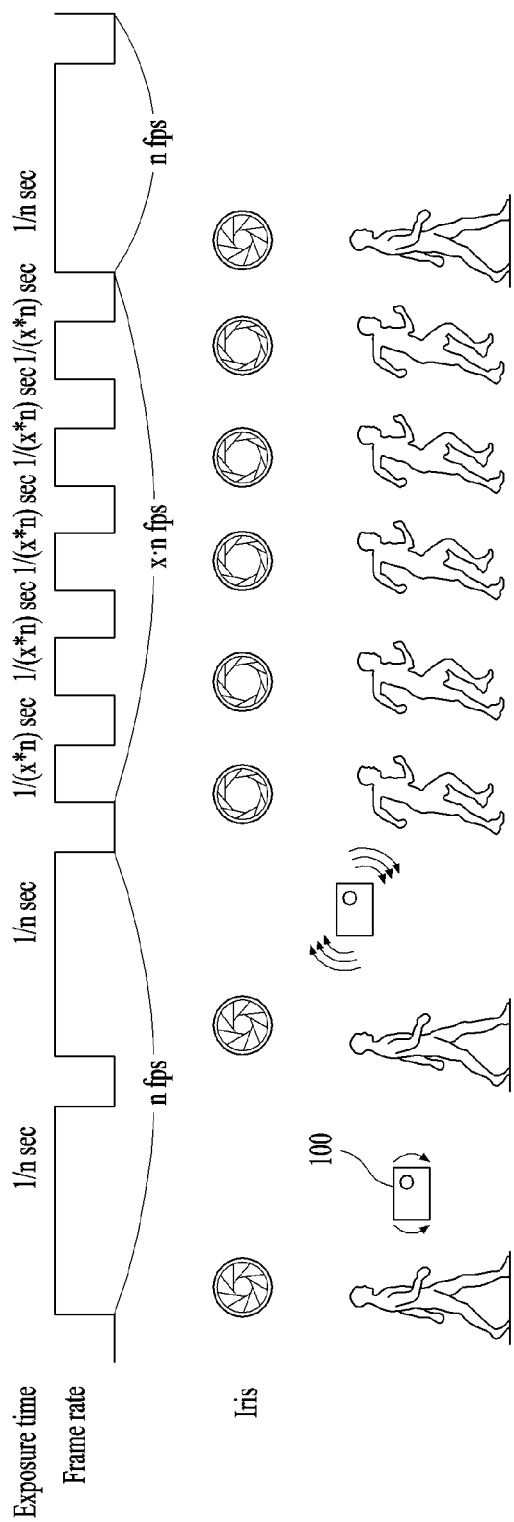
FIG. 22 is a schematic diagram to illustrate a step of measuring a movement and steps of adjusting video obtaining conditions in the above described controlling method.
Figure 23:
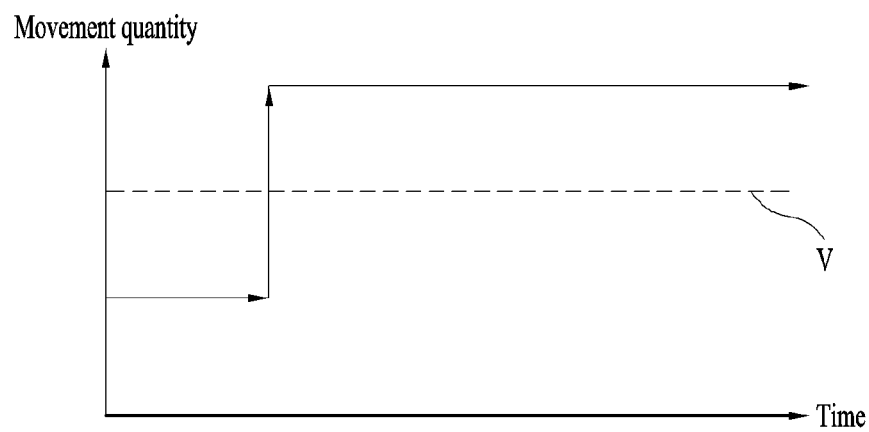
FIG. 23 is a graph of a movement quantity for a time considered in a step of detecting a movement of a subject.
Figure 24:
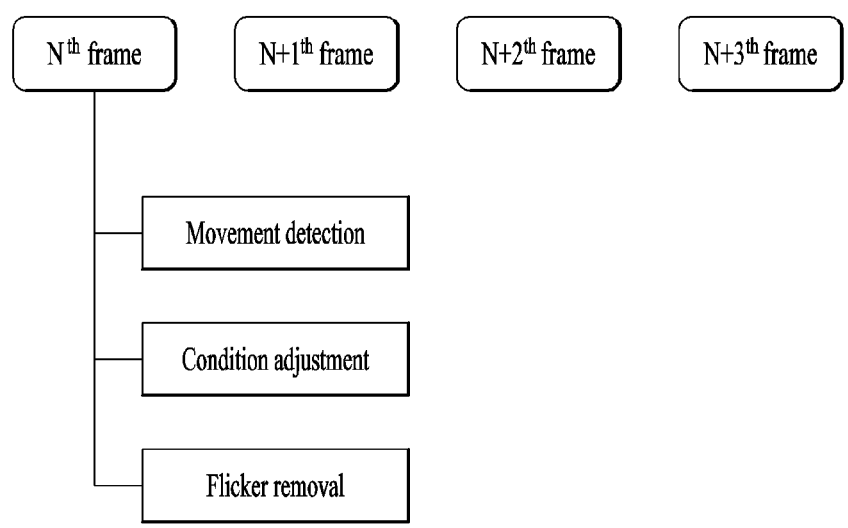
FIG. 24 is a schematic diagram to illustrate a relationship between the consecutively obtained frames and the measuring and adjusting steps.
Figure 25:
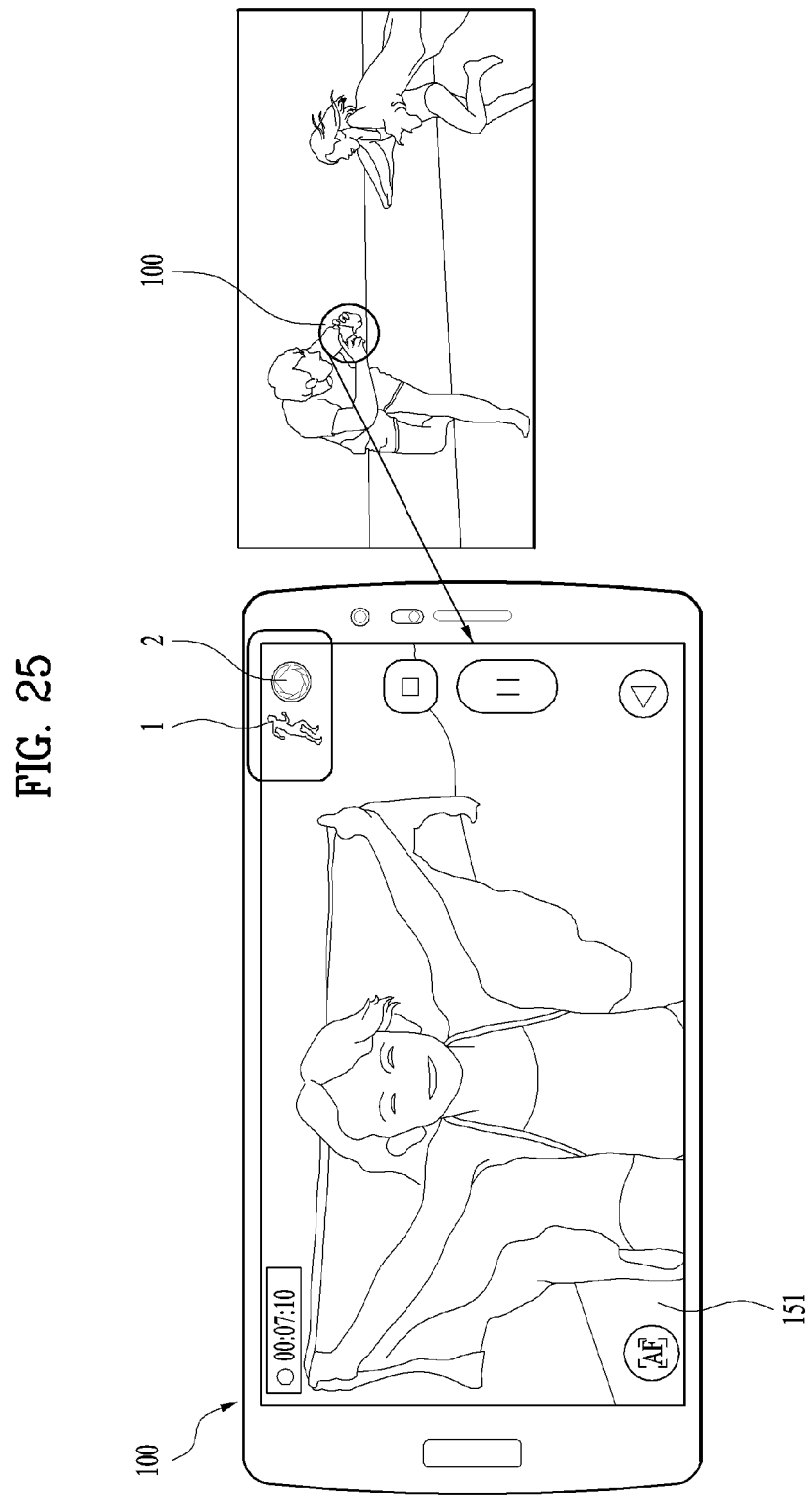
FIG. 25 is a schematic diagram of a smart device displaying the currently performed measuring and adjusting steps.

In continuation with the basic configuration for the above-mentioned controlling method, a controlling method using such a configuration is described in detail with reference to the accompanying drawings additionally related to FIG. 15. Regarding the additionally related drawings, FIG. 21 is a schematic diagram (or view) of a process for obtaining a frame in an image sensor of a camera module, FIG. 22 is a schematic diagram to illustrate a step of measuring a movement and steps of adjusting video obtaining conditions in the above controlling method, FIG. 23 is a graph of a movement quantity for a time considered in a step of detecting a movement of a subject, FIG. 24 is a schematic diagram to illustrate the relations between the consecutively obtained frames and the measuring and adjusting steps, FIG. 25 is a schematic diagram of a smart device displaying the currently performed measuring and adjusting steps to a user. A controlling method described in the following control operations of the components (i.e., various parts) described with reference to FIGS. 1A to 14 and is able to provide the functions intended on the basis of these operations. Hence, the operations and functions related to the controlling method can be regarded not only as the features of the controlling method but also as the features of all the related corresponding structural components. Particularly, the controller or the processor 180 may be called one of various names such as a control unit, a control device and the like, and is able to control all the components of the smart device 100 to perform a prescribed operation. Therefore, the controller 180 substantially controls the steps of all methods described in the following and all the steps described in the following can become the features of the controller 180.

In a controlling method according to the present application, referring to FIG. 15, the camera module 200 of the smart device 100 can obtain a video of a subject using preset conditions (S10). Unlike a photo or a still image, a moving image (i.e., a video) consists of accumulation of subject's images consecutively obtained during a prescribed time. Hence, in order to actually obtain a video in the obtaining step S10, the image sensor 233 of the camera module 200 can keep obtaining a multitude of images during a prescribed time. Moreover, since the image sensor 233 obtains the images by a single complete frame unit, the obtaining step S10 may be described as obtaining a multitude of frames using the image sensor 233.

As mentioned in the foregoing description, a quality of an image may be mostly affected by a quantity of a light arriving at the image sensor 233 by being incident on the lens L shown in FIG. 6. Such a quantity of light is called an exposure. And, the exposure may be determined by a size of the aperture 350 of the iris 300, a frame rate, a sensitivity of the sensor 233 and the like. The size of the aperture 350 can directly determine the quantity of the light received by the lens L and the sensor 233. The frame rate means a frame obtained per unit time, i.e., the number of images, and uses fps as a unit. Once the frame rate is determined, a time for the image sensor 233 to be exposed to a light focused by the lens L to obtain a signal image can be relatively determined. Namely, an exposure time can be relatively determined. Finally, the sensitivity may mean a strength of a signal detected by the image sensor 233. In particular, the sensitivity indicates how much quantity of an electrical signal is detected from the light by the image sensor 233 and may be called a gain or ISO. Yet, adjusting such a gain may cause noise to an obtained image. Hence, in the obtaining step S10, it is able to obtain the video in consideration of preset conditions such as a frame rate, an exposure time, an aperture size and the like. These conditions may have prescribed initial values. When the obtaining step S10 starts, these initial values may be applied in the first place. Hence, the conditions mentioned in the following description of the controlling method can be appreciated as having prescribed values. And, it should be also appreciated that these values are changeable to improve a quality of an obtained image, i.e., a quality of a video.

The smart device 100 can detect a relative movement between the subject and the smart device 100 as well (S20). As mentioned in the foregoing description, a video consists of consecutively obtained images. And, the currently described controlling method is not to improve a quality of an already obtained video, but is to improve a quality of a currently obtained video. Hence, the detecting step S20 may be performed at least while the obtaining step S10 is performed. For the same reason, the detecting step S20 can keep being repeated like the obtaining step S10 until the obtainment of the video stops.

Referring to FIG. 21, in forming a single frame, the image sensor 233 does not expose all pixels of its own to an incident light but is able to expose the pixels from a first row to a last row, i.e., row by row. Hence, as shown in the drawing, a small delay occurs between the exposures of the rows, whereby a substantial delay may be generated by the integration of the small delays between the obtained frames. Hence, in case that a shooting environment is dynamic, a distortion of an obtained image, i.e., a distortion of a frame may be generated from such a delay. In particular, when a subject or the smart device 100 moves or both of the subject and the smart device 100 move, a relative movement, i.e., a dynamic shooting environment may be generated between the subject and the smart device 100. Yet, since movements are generally generated quickly and continuously in the dynamic environment, a movement cannot be appropriately reflected by a single frame due to the aforementioned delay. Hence, in the dynamic environment, a quality of frame (i.e., image) may be degraded.

In order to remove or suppress such a phenomenon, the smart device 100 can detect the movement of the subject in the detecting step S20 (S21). Moreover, the smart device 100 can detect a movement of its own (S22). Furthermore, for more accurate relative movement detection, the smart device 100 can measure both movement of itself and movement of the subject (S21, S22). For instance, referring to FIG. 22, a subject can walk or run and may generate another movement that is different from the walking or the running. A user of the smart device 100, i.e., a photographer can walk or run and may generate another movement that is different from the walking or the running. And, the smart device 100 can move together with the smart device 100 in accordance with such a user's movement.

Figure 16:
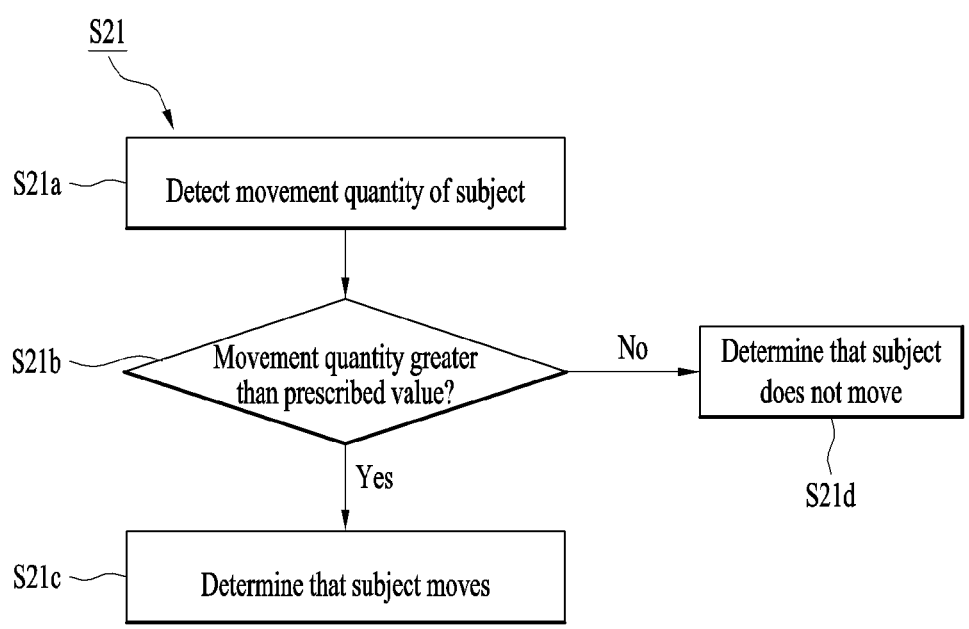
FIG. 16 is a detailed flowchart of a step of detecting a movement of a subject in the above described controlling method.

In order to preferentially detect the movement of the subject among the above-mentioned movements, in the detecting step S21, as shown in FIG. 16, the smart device 100 can detect a movement quantity of the subject from the video obtained in the obtaining step S10, and more accurately, from the frames obtained in the obtaining step S10 (S21*a*). Such a movement quantity can be detected in a manner of performing an image analysis on the obtained frame. Moreover, referring to FIG. 23, the movement quantity can keep being detected while the video is obtained. And, the detected movement quantity may be compared to a prescribed threshold (S21*b*). If the detected movement quantity exceeds the prescribed threshold V, as shown in FIG. 23, the smart device 100 can determine that the subject is moving (S21c). If the detected movement quantity fails to exceed the prescribed threshold V, as shown in FIG. 23, the smart device 100 can determine that the subject is not moving (S21d). meanwhile, in order to detect a movement of the smart device 100, in the detecting step S22, the smart device 100 can detect a movement of itself directly using the sensor in the detecting step S22. As mentioned in the foregoing description with reference to FIG. 14, the smart device 100 may include a gyroscope sensor and the acceleration sensor 143 and is able to directly detect a movement using these sensors 143.

If the smart device 100 fails to detect any movements of the device itself and the subject in the detecting step S20, the previously set values of the conditions, e.g., the initial values in the obtaining step S10 can be continuously maintained. Hence, the obtaining step S10 can keep obtaining the video using the conditions, the previously set values of the conditions, and the initial values.

If the smart device 100 detects a relative movement, i.e., a movement of the smart device 100 and/or a movement of the subject in the detecting step S20, the smart device 100 can adjust at least one of the conditions based on the detected movement (S30). The adjusting step S30 may be the step of actually changing the conditions, i.e., the previously set values of the video obtaining condition into new values. Hence, in the following description of the controlling method, the adjustment or change of the condition can be appreciated as substantially adjusting or changing the values of the condition. For the same reasons as mentioned in the detecting step S20, the adjusting step S30 can be performed at least while the obtaining step S10 is performed. And, the adjusting step S30 can keep being repeated like the obtaining step S10 until the video stops being obtained.

Referring to FIG. 22, a frame rate becomes the number of frames obtained per unit time, i.e., n fps (where, n is the number of frames), whereby an exposure time becomes a reciprocal number of the frame rate, i.e., 1/n sec (where, sec indicates second). Hence, if the frame rate increases, the exposure time may decrease. Since the exposure time means a time given to form a single frame in the sensor 233, a short exposure time may mean that such a forming time (i.e., a time for an electrical signal of an image to stay by being generated in the sensor 233) is short. If the forming time decreases, the delay described with reference to FIG. 21 can be relatively reduced and the image distortion can be reduced as well. If the exposure time decreases, it reduces a time for the sensor 233 to receive a light. Hence, an obtained image (i.e., a frame) may become dark. In order to compensate for brightness, the aperture 350 of the iris 300 can be enlarged to introduce more light to the sensor 233. For such a reason as mentioned, if the frame rate is increased under the relative movement and the aperture 350 is enlarged, it is able to obtain an image (i.e., a video) of a high quality. Meanwhile, the brightness can be compensated for by raising the sensitivity of the sensor 233. Yet, if the sensitivity is raised, noise may be caused by the amplification of the electrical signal obtained from the sensor 233. Hence, the adjustment of the sensitivity of the sensor 233 to improve an image quality may be limited.

For such reasons as mentioned, if the smart device 100 detects the movement of the smart device 100 and/or the movement of the subject, the smart device 100 can increase the frame rate of the video (S31). By the increase of the frame rate, the smart device 100 can decrease the exposure time relatively (S32). In particular, by the adjusting step S30, the frame rate can have a value that is greater than a previously set value, e.g., the initial value in the obtaining step S10 (S31). Likewise, the exposure time can have a value that is smaller than a previously set value, e.g., the initial value in the obtaining step S10 (S32). Moreover, in order to compensate for the decrease of the brightness due to the increase of the frame rate and the decrease of the exposure time, if the smart device 100 detects the movement of the smart device 100 and/or the movement of the subject, the smart device 100 can enlarge the aperture 350 of the iris 300. Namely, the smart device 100 can increase a diameter of the aperture 350 (S33). In particular, by the adjusting step S30, the diameter of the aperture 350 can become greater than a previously set diameter, e.g., the diameter in the obtaining step S10 (S33). Hence, owning to the enlarged size of the aperture 350, a considerable quantity of light is introduced into the lens L so that the brightness can be increased to obtain an image of a good quality. The iris 300 mentioned in the foregoing description can perform the increasing step S33 without any delays owing to the high response, whereby an image of a high quality, i.e., a video can be secured as intended. Yet, for the increasing step S33, any structures capable of adjusting a quantity of an incident light can be used as well as a normal iris.

Moreover, in the adjusting step S30, the conditions can be adjusted to have different values in accordance with a size of quantity of the detected movement. For instance, referring to FIG. 22, while a subject or a photographer is walking, a frame rate and an exposure time are n fps and 1/n sec, respectively. Yet, while the subject or the photographer is running, the frame rate and the exposure time are x·n fps and 1/(x·n) sec, respectively. Hence, the frame rate increases by x times but the exposure time decreases by x times. Likewise, an aperture size on the walking of the subject or photographer may be greater than an aperture size on the running of the subject or photographer. By this additional adjustment, a video quality can be further improved.

The conditions adjusted in the aforementioned adjusting step S30 can be applied to the obtaining step S10 again and a video can be obtained under the adjusted condition.

As schematically mentioned in the foregoing description, in order to improve the quality of the consecutively obtained video, like the obtaining step S10, the detecting step S20 and the adjusting step S30 can keep being repeated while the smart device 100 obtains the video. In particular, once a relative movement is detected in the detecting step S30, the video can be obtained in the obtaining step S10 under the condition adjusted in the adjusting step S30 until no movement is detected in the repeated detecting step S30. If a quantity of the movement detected in the repeated detecting step S30 is changed, as mentioned in the foregoing description, the conditions can be adjusted to have different values in accordance with a size and quantity of the detected movement in the adjusting step S30. Under the adjusted condition, videos can be obtained again in the obtaining step S10. Meanwhile, if any movement is not detected in the repeated detecting step S30, the conditions may return to the previously set values, e.g., the initial values. According to the previously set values, the obtaining step S10 can be performed.

Moreover, for the better quality of the video, the detecting step S20 and the adjusting step S30 can be performed in real time. Referring to FIG. 24, the detecting step S20 and the adjusting step S30 can be performed on each frame of the obtained video. Moreover, the detecting step S20 and the adjusting step S30 for a prescribed frame (e.g., $N^{th}$ frame) can be completed before a following frame (e.g., $(N+1)^{th}$ frame) starts to be obtained. In particular, the obtained video includes a first frame and a second frame obtained in continuation with the first frame. And, the detecting step S20 and the adjusting step S30 performed on the first frame can be completed before the second frame starts to be obtained. Hence, the conditions adjusted by the adjusting step S30 can be directly applied to a new frame (i.e., $(N+1)^{th}$ frame or the second frame). By such a real-time execution, delay for the application of the adjusted condition is not generated, whereby a quality of the obtained video can be further improved.

If the smart device 100 detects the movement of the smart device 100 and/or the movement of the subject in the detecting step S20, the smart device 100 can notify the detection of the movement to a user (S40). Moreover, if the smart device 100 adjusts the conditions in the adjusting step S30, the smart device 100 can notify the adjustment of the conditions to the user (S50). FIG. 25 shows that both the photographer (i.e., the smart device 100) and the subject are moving. If the photographer starts to obtain the video of the subject in FIG. 25 (S10), the smart device 100 can detect a relative movement (S20). Moreover, by the detection of the movement (S20), the smart device 100 can adjust the conditions applied to the video obtainment (S30). This detection and adjustment can be displayed on the display unit 151 of the smart device 100, as shown in FIG. 25. In particular, the detection can be denoted by an icon 1 in a prescribed size. Likewise, the adjustment can be denoted by an icon 2. On the other hand, the detection and adjustment may be displayed as a text on the display unit 151 instead of the icons 1 and 2. Since the user can easily recognize the dynamic shooting environment and the corresponding condition adjustment by the notifying steps S40 and S50, the user can use the smart device 100 more conveniently.

Meanwhile, when the obtained video is played, a flicker may appear due to various reasons. The flicker means a visible fading periodically occurring on a screen of a display and may become a factor of lowering a quality of the obtained video. Such a flicker occurrence may be affected by a light source used specifically when a video is obtained. For instance, an artificial light source may have a unique frequency. If the frequency of the artificial light source is not synchronized with a frame rate applied to the video obtainment in the obtaining step S10, brightness of a frame obtained by the sensor 233 may be imbalanced, which may bring a flicker corresponding to a partial fading. Therefore, in the controlling method according to the present invention, the smart device 100 can additionally remove the flicker from the obtained video in accordance with the light source used in the obtaining step S10, and more particularly, with a type of this light source (S60).

Figure 17:
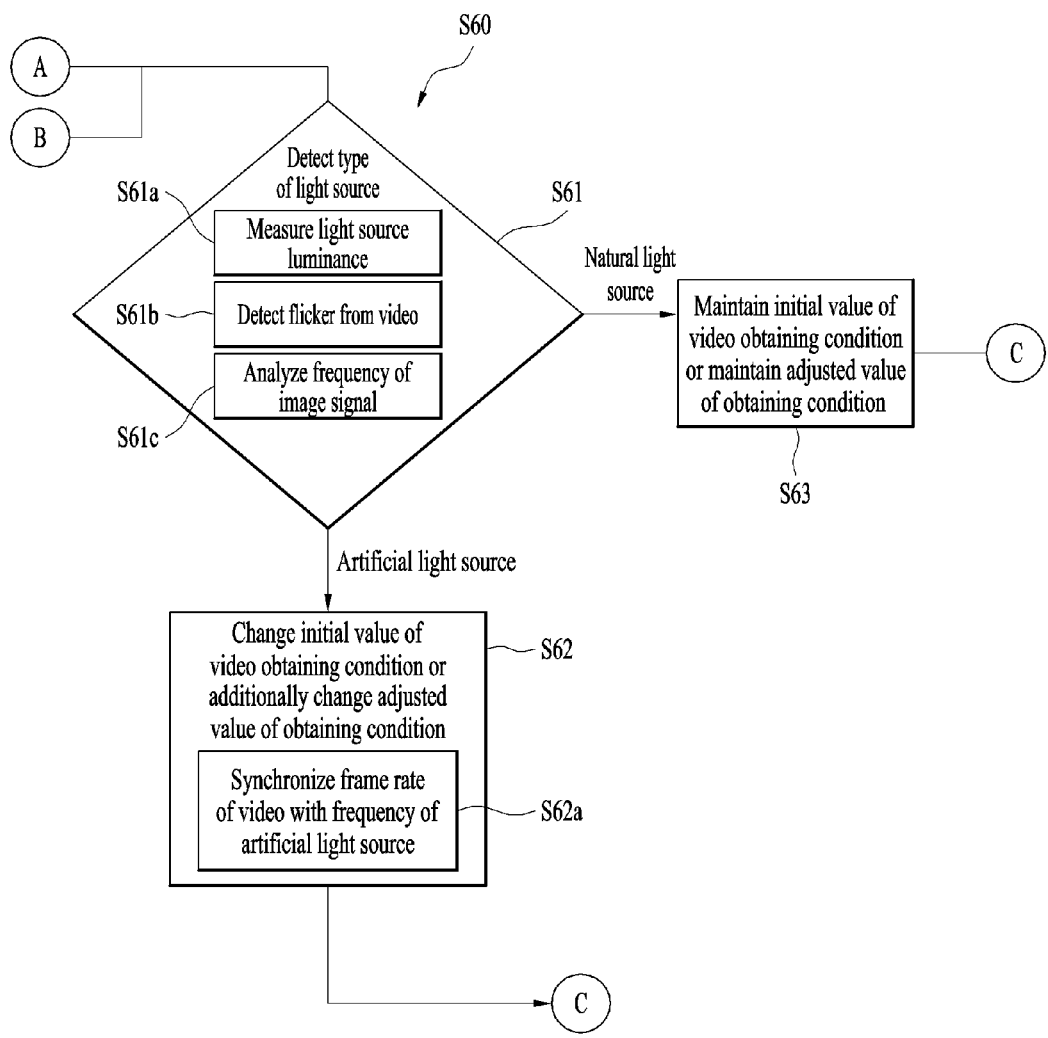
FIG. 17 is a detailed flowchart of a step of removing a flicker in the above described controlling method.
Figure 18:
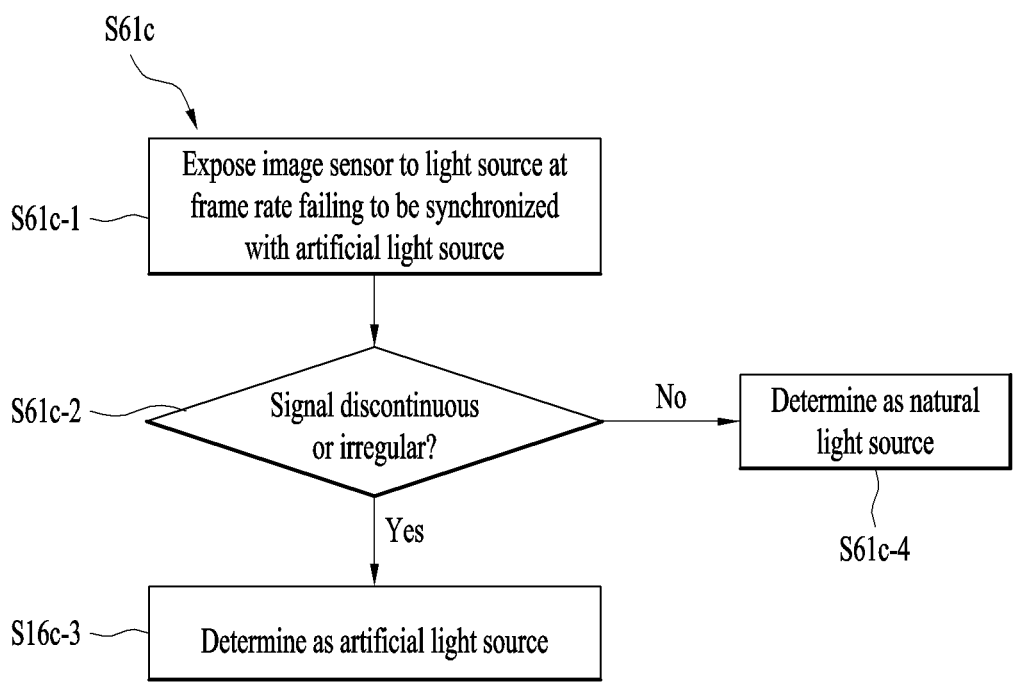
FIG. 18 is a detailed flowchart of a step of detecting a type of a light source in the flicker removing step shown in FIG. 17.
Figure 19:
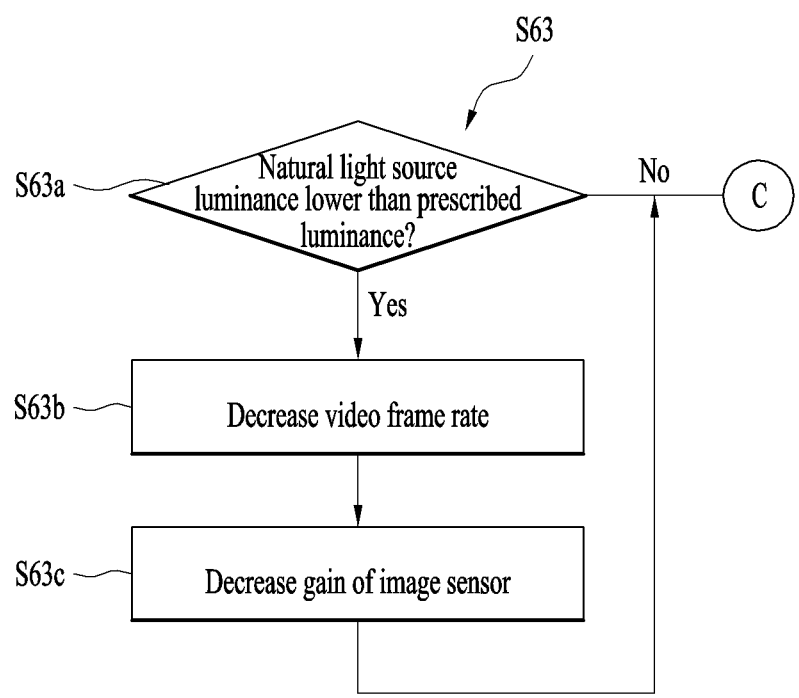
FIG. 19 is a detailed flowchart of a step of adjusting a video obtaining condition additionally when a light source used in the flicker removing step shown in FIG. 17 is a natural light source.

FIG. 17 is a detailed flowchart of a step of removing a flicker in the above mentioned controlling method. FIG. 18 is a detailed flowchart of a step of detecting a type of alight source in the flicker removing step shown in FIG. 17. And, FIG. 19 is a detailed flowchart of a step of adjusting a video obtaining condition additionally when a light source used in the flicker removing step shown in FIG. 17 is a natural light source. The removing step S60 is described in detail with reference to these drawings as follows.

First of all, irrespective of the aforementioned relative movement between the smart device 100 and the subject, the flicker may be generated by other reasons (e.g., a type of a light source, etc.). Hence, the removing step S60 can be always performed for both the case that the relative movement occurs and the case that the relative movement does not occur while the video is obtained. In particular, as FIG. 15 and FIG. 17 are connected to each other via 'A' and 'B', the removing step S60 can be performed for both the case A that the movement does not occur in the detecting step S20 and the case B that the movement occurs in the detecting step S20 and that prescribed conditions are adjusted in the adjusting step S30. For the same reasons as mentioned for the detecting step S20 and the adjusting step S30, the removing step S60 can be performed at least while the obtaining step S10 is performed. And, the removing step S60 can keep being repeated like the above steps S10 to S30 until the video stops being obtained.

In the removing step S60, the smart device 100 can detect a type of a light source (S61). First of all, in the detecting step S61, the smart device 100 can measure a luminance of the detected light source (S61a). In the measuring step S61a, the smart device 100 can measure intensity of illumination of an external light source using a separate sensor, e.g., the illumination sensor 142 shown in FIG. 1A. In this case, the intensity of illumination means a light flux applied to a predetermined area and may indicate a strength of light, i.e., a luminance. Generally, the luminance of an artificial light source provided in a room is less than the luminance of a natural light source. Hence, if the measured illumination intensity is equal to or greater than a predetermined value, the smart device determines the corresponding light source as a natural light source. If the measured illumination intensity is smaller than the predetermined value, the smart device determines the corresponding light source as an artificial light source. On the other hand, in the detecting step S61, the smart device 100 can directly detect the flicker from the obtained video (S61b). In the detecting step S61b, the smart device 100 can perform an image analysis on the obtained video. Through the performed video analysis, if a fading appears in the obtained video, the smart device 100 can determine that the flicker has occurred. If the flicker, i.e., the fading, exists in the obtained video, the smart device 100 can determine that the light source is an artificial light source. If the flicker, i.e., the fading, does not exist in the obtained video, the smart device 100 can determine that the light source is a natural light source.

Alternatively, in the detecting step S61, the smart device 100 can analyze a frequency of an electrical signal obtained from the image sensor 233 (S61c). Since the image sensor 233 of the camera module 200 is used for image obtainment, the analyzing step S61c can use another image sensor 143 (e.g., RGB sensor) that is separate from the image sensor 233. As the RGB sensor is configured to obtain an image of high resolution, i.e., a relatively large quantity of electrical signals, it can be useful for the frequency analysis for light source type detection. In the analyzing step S61c, as shown in FIG. 18, the smart device 100 can expose the image sensor 143 to the light source at a prescribed frame rate failing to be synchronized with the artificial light source (S61c-1). In this case, since 1 frame is formed by 1 exposure of a sensor, a frame rate actually becomes the number of exposures of a sensor per unit time. And, the exposing step S61c-1 may be described as using the number of exposures per time failing to be synchronized with the artificial light source. Moreover, the artificial light source normally has a frequency of 50 Hz or 60 Hz. Hence, the frame rate in the exposing step S61c-1 can have a frequency that is not 50 Hz (i.e., 50 fps) or 60 Hz (i.e., 60 fps). In case that the external light source is the artificial light source, a frequency of an image signal obtained from the image sensor 143 fails to be synchronized with a frequency of the artificial light source. If asynchronization of frequency occurs, a waveform or phase of a signal finally obtained from the sensor 143 may become discontinuous or irregular. Hence, such discontinuity or irregularity may mean that the external light source is the artificial light source. For such a reason as mentioned, in the analyzing step S61c, the smart device 100 can detect the discontinuity or irregularity of the electrical signal obtained from the image sensor (S61c-2). Such detection can be performed through the frequency or waveform analysis of a signal finally obtained from the image sensor 143. If the waveform or phase of the obtained electrical signal is changed discontinuously or irregularly, the smart device 100 can determine the light source as an artificial light source (S61c-3). If the waveform or phase of the obtained electrical signal is changed continuously and regularly, the smart device 100 can determine the light source as a natural light source (S61c-4).

If the type of the light source is detected in the detecting step S61, the smart device 100 can change the condition, i.e., the video obtaining conditions in accordance with the detected type of the light source (S62). As mentioned in the foregoing description, the removing step S60 can be performed for both the case that the relative movement occurs and the case that the relative movement does not occur. Hence, when the relative movement is detected in the detecting step S20 and the conditions are adjusted in the adjusting step S30, if the smart device 100 detects the external light source as the artificial light source in the detecting step S61, the smart device 100 can additionally change at least one of the conditions adjusted in the adjusting step S30 (S62). On the other hand, when no relative movement is detected in the detecting step S20, if the smart device 100 detects that the external light source is the artificial light source in the detecting step S61, the smart device 100 can change at least one of the conditions in the obtaining step S10, i.e., at least one of the initial values of the conditions (S62).

Since the flicker has a close relation with a frequency of the artificial light source specifically, the frame rate or exposure time associated with the frequency can be changed in the changing step S62. Hence, in the changing step S62, the smart device 100 can synchronize the frame rate or the exposure time with the frequency of the artificial light source (S62a). In this case, the frequency synchronization may request two frequencies, which are to be synchronized with each other, to have the same value overall. The synchronization may request that one frequency is increased into 2n times of the other frequency or decreased into 1/2n times of the other frequency. Hence, in the synchronizing step S62a, the smart device 100 can set the frame rate among the conditions to the same value of the frequency of the artificial light source. Moreover, the smart device 100 can set the frame rate to 2n or 1/2n times of the frequency of the artificial light source, where n=1, 2, 3, 4 . . . . . Thus, the brightness of the frame obtained by such synchronization can be balanced and the flicker is not generated from the obtained video under the artificial light source. Hence, as FIG. 15 and FIG. 17 are connected to each other through 'C', the condition changed in the aforementioned changing step S62, e.g., the frame rate changed for the flicker removal can be applied to the obtaining step S10 again and the video can be obtained in accordance with the adjusted condition.

Meanwhile, since the natural light source does not generate the flicker due to the frequency asynchronization like the artificial light source, it may be unnecessary to change conditions additionally. Hence, when the relative movement is detected in the detecting step S20, the relative movement is detected in the adjusting step S30, and the conditions are adjusted, if the smart device 100 detects the external light source as the natural light source in the detecting step S61, the smart device 100 can maintain the conditions adjusted in the adjusting step S30, i.e., the adjusted values of the conditions (S63). Moreover, if no relative movement is detected in the detecting step S20, the smart device 100 can maintain the conditions in the obtaining step S10, i.e., the initial values of the conditions intact (S63). As FIG. 15 and FIG. 17 are connected to each other through 'C', the maintained adjusted or initial values can be applied to the obtaining step S10 again and the video can be obtained in accordance with the adjusted condition. Moreover, since the natural light source does not generate the flicker, the adjusted or initial values of the conditions can be additionally modified to obtain an image or video of a better quality instead of being maintained.

Moreover, although the natural light source is detected by the detecting step S61, such a natural light source may be darker than the artificial light source. For instance, in the late afternoon, an outdoor natural light source is darker than an indoor artificial light source. Hence, although the light source used for the video obtainment in the obtaining step S10 is the natural light source, if the luminance of the natural light source is less than a prescribed luminance, conditions applied to the video obtainment can be additionally adjusted. In particular, referring to FIG. 19, the smart device 100 can compare the luminance of the natural light source to a prescribed luminance (S63a). In this case, since the intensity of illumination can indicate the luminance of the light source, the smart device 100 can compare an actual measured illumination intensity to a prescribed luminance. Moreover, the luminance or the luminance intensity can be measured by the illumination sensor 142 of the smart device 100, or may be sensed by a separate sensor such as an RGB sensor or the like. If the luminance of the natural light source is not less than the prescribed luminance, it is determined that the natural light source is sufficiently bright. And, as FIG. 15 and FIG. 19 are connected to each other through 'C', the adjusted or initial values maintained in the maintaining step S63 can be applied to the obtaining step S10 again for the video obtainment. On the other hand, if the luminance of the natural light source is less than the prescribed luminance, it is determined that the natural light source is not sufficiently bright. Hence, the smart device 100 can decrease the frame rate of the video in the first place (S63b). In the decreasing step S63b, the smart device 100 can additionally decrease the initial value of the frame rate in the obtaining step S10 or the adjusted value of the frame rate in the adjusting step S30 into a desired value. If the frame rate of the value sufficiently decreased by the obtaining step S10 or the adjusting step S30 is already applied to the video obtainment, the frame rate may not be additionally decreased in the decreasing step S63b. Once the frame rate is decreased, the exposure time is relatively increased. Hence, the brightness of the obtained image (i.e., frame) may be increased to compensate the dark natural light source. Moreover, the smart device 100 can decrease a gain of the image sensor 233 (S63c). If the gain is decreased, strength of a signal obtained from the sensor 233 can be relatively decreased. Since the noise is decreased in the image owing to the decrease of the gain, it is able to compensate for quality degradation (e.g., image distortion, etc.) due to the frame rate decrease. As FIG. 15 and FIG. 19 are connected to each other through 'C', the decreased frame rate and the decreased gain can be applied to the obtaining step S10 for the video obtainment.

As mentioned in detail in the foregoing description, in order to improve the quality of the continuously obtained video, like a series of the above steps S10 to S30, the removing step S60 can keep being repeated while the smart device 100 obtains the video. Moreover, for the better quality of the video, the removing step S60 can be performed in real time. Referring to FIG. 24, like the detecting step S20 and the adjusting step S30, the removing step S60 can be performed on each frame of the obtained video. And, the detecting step S60 for a prescribed frame (e.g., $N^{th}$ frame) can be completed before a following frame (e.g., $(N+1)^{th}$ frame) starts to be obtained. Hence, the conditions adjusted in the removing step S60 can be directly applied to a next frame. By such a real-time execution, delay for the application of the adjusted condition is not generated, whereby a quality of the obtained video can be further improved.

Meanwhile, as described in association with the steps S10 to S60, the video obtaining conditions can be adjusted or changed for a better quality in consideration of a relative movement or a flicker. Therefore, the obtained video includes different conditions, and more accurately, different values of the conditions. For such a reason as mentioned, the smart device 100 may require an interface and controlling method that is different from normal ones for controlling the obtained video appropriately.

Figure 20:
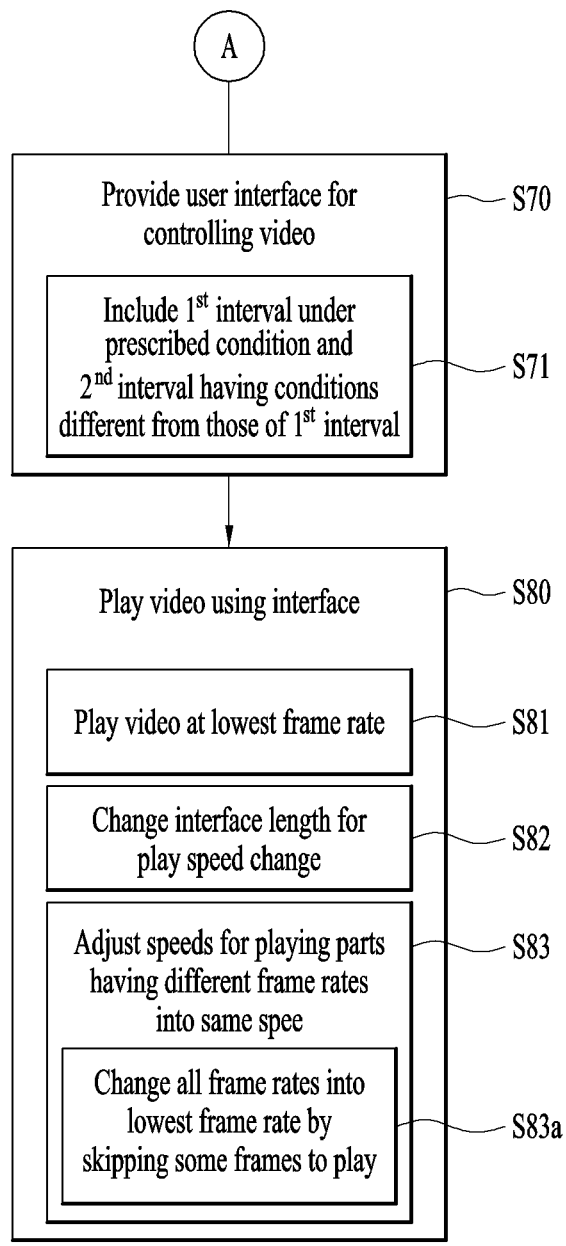
FIG. 20 is a detailed flowchart of a step of providing a user interface and a step of playing a video using the user interface in the above described controlling method.
Figure 26:
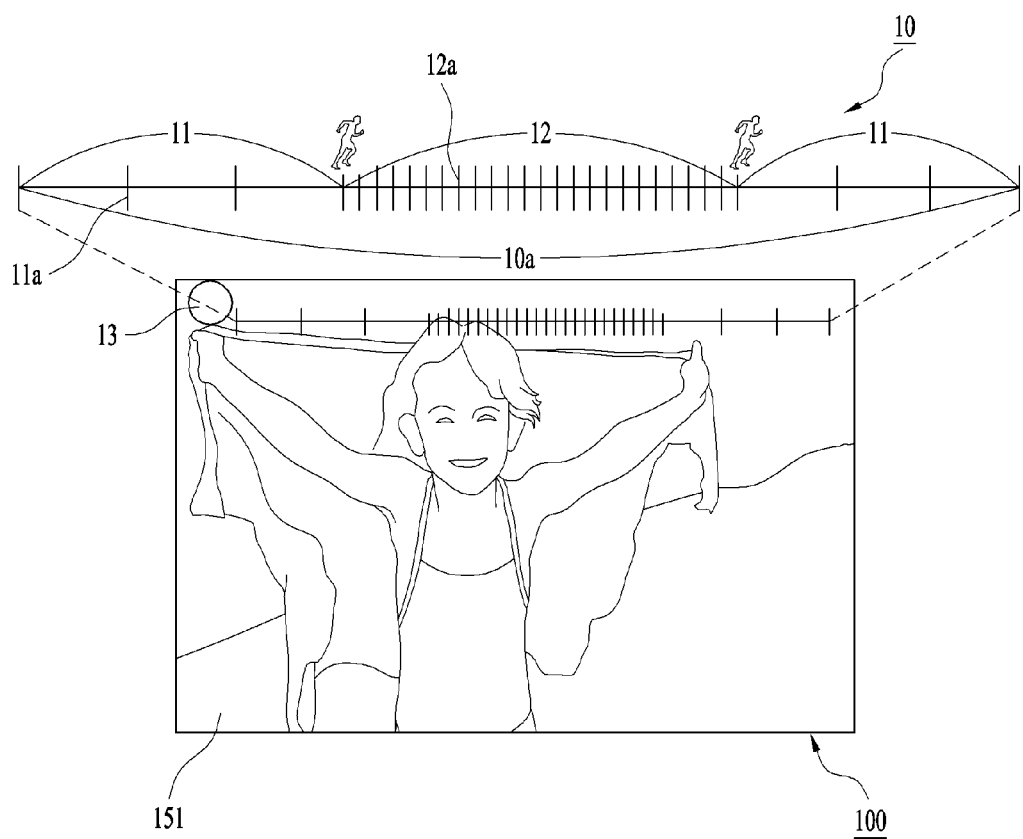
FIG. 26 is a schematic diagram of a smart device currently playing the video and a user interface provided by the smart device.

FIG. 20 is a detailed flowchart of a step of providing a user interface and a step of playing a video using the user interface in the above discussed controlling method. And, FIG. 26 is a schematic diagram of a smart device currently playing the video and a user interface provided by the smart device. An interface and controlling method for an obtained video are described in detail with reference to such drawings as follows.

First of all, the smart device 100 can provide a user with a user interface 10 configured to control a video of a subject (FIG. 26) (S70). As FIG. 15 and FIG. 20 are connected to each other through 'D', the user interface 10 may be provided after completion of obtaining the video. Using the interface 100, the user can basically play the obtained video. Moreover, using the user interface 10, the user can perform an editing (e.g., copy, delete, give special effect, etc.) on the video. Each time a prescribed control (e.g., execution of the above functions, etc.) on the video is requested, the smart device 100 can provide the user interface 10. For instance, when the obtained video is used on a prescribed application, the smart device 10 can display the user interface 10 on the display unit 151 together with a screen of the application whenever necessary. FIG. 26 shows one example of the user interface 10 provided together with the application for playing the obtained video.

As mentioned in the foregoing description, the smart device 100 can obtain the video containing the different values of the conditions through the steps S10 to S60. Moreover, the obtaining, detecting, adjusting and removing steps S10, S20, S30 and S60 can be performed for the better quality of the video continuously and repeatedly in real time until the video stops being obtained. In particular, the adjustment and change of the conditions, and more specifically, the adjustment and change of the values of the conditions can be performed continuously and repeatedly until the video obtainment ends. Hence, the obtained video has conditions of different values and can consist of a multitude of parts consecutively obtained with interruption. In particular, the obtained video includes a multitude of the parts mentioned in the above description and may correspond to a single video obtained by the smart device 100 in accordance with a single obtainment start and a single end. Moreover, in order to appropriately represent the single video having such features, as shown in the drawing, the user interface 10 can be configured to display the parts consecutively in a single frame or span 10a.

Moreover, as mentioned in the foregoing description, it may be difficult to adjust a frame rate without the compensation for the quantity of light by the iris 300, i.e., the compensation for the brightness. As mentioned in the foregoing description of the related art in the present application, it is difficult to apply the general irises to the smart device 100 due to the sizes of the general irises unlike the iris 300 of the present application. Therefore, in general, a smart device 100 may have difficulty in changing a frame rate in the course of obtaining a video due to absence of an iris. Hence, since a separate operation is required for the brightness compensation in order to change a frame rate, it is necessary to stop the video obtainment. For such a reason as mentioned, a single video may generally include a single frame rate in the conventional smart device 100. Unlike such a general video, a video of the controlling method according to the present application has different frame rates owing to the iris 300 and a dynamic control of the iris 300 and may consist of a multitude of parts obtained consecutively. Therefore, the user interface 10 may be configured to display a multitude of the parts consecutively. The user interface 10 shown in FIG. 26 is configured to show the different frame rates in a single video for example. Yet, the user interface 10 can be additionally configured to show the adjustable different conditions (e.g., exposure time, iris aperture size, gain, etc.).

In particular, the user interface 10 may include a first interval 11 indicating a first part of a video including conditions having a prescribed first value (S71). The user interface 10 may include a second interval 12 indicating a second part of the video obtained in continuation with the first part by including conditions having second values that are different from the first value (S71). In this case, the second interval 12 may be disposed in continuation with the first interval 11. Although the second interval 12 may be disposed in various directions, as shown in the drawing, it may be disposed in a horizontal direction in continuation with the first interval 11 in order to be easily recognized by a user. As mentioned in the foregoing description, since the example shown in FIG. 26 is configured to display an adjusted frame rate, the user interface 10 may include a first interval 11 indicating a first part of a video having a prescribed first frame rate and a second interval 12 indicating a second part obtained in continuation with the first part to have a second frame rate that is different from the first frame rate. Likewise, the second interval 12 may be disposed in a horizontal direction in continuation with the first interval 11. According to the example shown in FIG. 26, the first interval 11 is an interval having no movement but the second interval 12 may become a relative movement occurring interval. Hence, the second frame rate can be set to be greater than the first frame rate by the adjusting step S30.

A length of the first interval 11 or a length of the second interval 12 in the user interface 10 may be determined according to a period of time taken to obtain a corresponding part of a video. For instance, the first interval 11 and the second interval 12 may have the same lengths for the first part and the second part of the video obtained during the same periods of time, respectively. If the first part is obtained during a period of time that is longer than a period of time of the second part, a length of the first interval 11 can be set to be greater than a length of the second interval 12. Hence, a user can be visually informed of the period of time of each of the parts through the user interface 10. The first interval 11 may include gradations 11a that are set equally to correspond to the number of same frames. And, the second interval 12 may include gradations 12a that are set equally to correspond to the number of same frames. Since a frame rate means the number of frames obtained per unit time, intervals having different frame rates may include different numbers of gradations 11a and 12a. For instance, as a frame rate of the second interval 12 is greater than a frame rate of the first interval 11, the second interval 12 can include the gradations 12a that are more than gradations of the first interval 11 in the same length. Hence, a user can visually recognize the different frame rates and their sizes via the user interface 10.

Using the user interface 10, the user can freely perform various controls on the obtained video. As a control of 'play' is the most basic, a play of an obtained video is described as follows. For instance, FIG. 26 shows a screen for playing a video, an interface provided to the screen, and a partial enlargement of the interface. Referring to FIG. 26, the video can be displayed on the display unit 151 of the smart device 100 while the video played. In particular, while the video is played, a subject in the video can be displayed on the display unit 151 or the screen of the display unit 151.

First of all, a user or the smart device 100 can play an obtained video on the display unit 151 using the user interface 10 (S80). Since the obtained video includes a multitude of conditions having different values, the smart device 100 may play the video in consideration of all conditions or may play the video according to one of the conditions. A frame rate among the conditions and a change of values of the frame rate are closely related to a play speed of the video, which can be easily recognized by the user. Hence, for instance, steps of playing a video according to a frame rate and different values of the frame rate are described in detail as follows.

As mentioned in the foregoing descriptions of the detecting step S20 and the adjusting step S30, an obtained video includes parts respectively having different frame rates. In particular, a movement occurring part may have a high frame rate, whereas a frame rate may become the lowest in a part having no movement. Generally, the movement occurring part may need to be examined in detail for the control (e.g., editing, play, etc.). Hence, in the playing step S80, the smart device 100 can basically play the video at the lowest one of the different frame rates (S81). In particular, the lowest frame rate becomes a real play speed and such a single play speed can be applied to a play of the entire video. Each of the parts having a high frame rate may include frames more than those of the part having the lowest frame rate during the same unit time, whereby a time assigned to a single frame play for each of the parts having the high frame rate is smaller than that assigned to a single frame play for the part having the lowest frame rate. If the play speed according to the lowest frame rate is applied, the play time assigned to a single frame in each of other parts having the high frame rates may increase relatively. Hence, the part of the video having the lowest frame rate is normally played, whereas the rest of the parts having frame rates that are different from the lowest frame rate (i.e., the rest of the parts having frame rates that are higher than the lowest frame rate) can be played slowly. In particular, while the video is played, the subject normally moves on the screen of the display unit 151 of the smart device 100 during the part having the lowest frame rate, whereas the subject moves slowly on the screen during the rest of the parts having the relatively higher frame rates. Since relative movements may occur in the parts having the high frame rates, the user can see the movement of the subject in detail for such slow movements. If such a playing step S81 is applied to the real example shown in FIG. 26, the smart device 100 can play both the first interval 11 (i.e., the first part of the video) and the second interval 12 (i.e., the second part of the video) at the first frame rate. For instance, if the first frame rate is 30 fps and the second frame rate is 120 fps, the second interval 12 (i.e., the second part) of 120 fps can be played at the first frame rate of 30 fps. Hence, during the play step, the subject in the second interval 12 can move slower than that in the first interval 11 within the screen.

Moreover, the user may need to change the play speed for the control of the video. Such a speed change may be performed in various ways. And, the speed change can be simply performed by a manipulation of the user interface 10. Hence, the user can change the play speed by changing the length of the user interface 10 (S82). For such a length change, the user can extend or reduce the user interface 10 displayed on the display unit 151 using a finger. Actually, in the changing step S82, for the change of the play speed in a prescribed part, the user can change the length of the user interface corresponding to the prescribed part. Moreover, once the length of the user interface is changed, a play time for a predetermined number of frames can be changed. In particular, if a length of a prescribed interval of the user interface is increased, it may result in increasing the play time for the predetermined number of the frames included in the corresponding interval before the change of the length. Hence, the number of frames played per unit time is reduced, whereby the play speed can be decreased. On the other hand, if a length of a prescribed interval of the user interface is decreased, it may lead to a result that is opposite to the former result mentioned in the above description. Namely, the play speed is raised.

If such a changing step S82 is applied to the real example shown in FIG. 26, in order to decrease the play speed of the first/second interval 11/12, the user can extend the length of the first/second interval 11/12 within the user interface. Moreover, in order to increase the play speed of the first/second interval 11/12, the user can reduce the length of the first/second interval 11/12 within the user interface. The extension/reduction of the length can actually extend/reduce the spaces of the gradations 11a and 12a in the user interface 10. If the play speed is decreased by the extension of the length, the subject can move relatively slow during the play. If the play speed is increased by the reduction of the length, the subject can move relatively fast during the play.

Meanwhile, as mentioned in the foregoing description, the parts having high frame rates are played relatively slowly due to the play speed according to the lowest frame rate and the played subject can move slowly within the screen. On the other hand, for an overall review, the user may need to play the video continuously at the same speed. Hence, the smart device 100 can adjust the speeds for playing the parts of the video having the different frame rates into the same speed (S83). In the adjusting step S83, actually, while the parts of the video having the different frame rates are played, the moving speeds of the subject on the screen of the display unit 141 can be adjusted to the same speed. In particular, while the video is played, the subject can move at the same speed on the screen of the display unit 151 in the entire parts of the video, and more particularly, in the part of the video having the lowest frame rate and the rest of the parts of the video having frame rates that are different from the frame rate of the former part, i.e., the frame rates that are higher than the lowest frame rate.

For such a speed adjustment, various methods are available. Specifically, the frame rate adjustment may be simple and easy. In particular, while the video is played, the smart device 100 can change the frame rates of the parts of the video to the lowest frame rate (S83a). In particular, according to the example shown in FIG. 26, while the video is played, the smart device 100 can change the second frame rate of the second interval 12 into the first frame rate of the first interval 11. In particular, while the video is played, the smart device 100 can skip some of the frames of the parts having different frame rates other than the part having the lowest frame rate. If the frames are randomly skipped, the video play may not be performed smoothly. Hence, the smart device 100 can skip the fixed number of frames per prescribed time or per prescribed frames. For instance, referring to FIG. 26, the first interval 11, i.e., the first part can have the first frame rate of 30 fps, while the second interval 12, i.e., the second part has the second frame rate of 120 fps. Compared to the first part, the second part may include 120 frames per second, i.e., frames 4 times more than the first part. While the video is played, a single frame can be played per 4 frames, i.e., per 1/20 second in the second interval 12 to match the first frame rate of the first interval 11. Moreover, the smart device 100 can play the best one of 4 frames in consideration of a play quality. Such a selective play brings an effect that a different frame rate, i.e., the second frame rate is substantially changed to the lowest frame rate, i.e., the first frame rate. And, the subject can move at the same speed while the video is played.

Moreover, the user interface may include a button 13 for the same play speed. Hence, while the video is played, the user toggles the button 13, thereby applying or releasing the same play speed according to the adjusting step S83.

As appreciated from the foregoing description and drawings, the controlling method adjusts the obtaining conditions according to a relative movement and is able to apply the adjusted condition directly to the video obtainment. Moreover, the controlling method changes the obtainment conditions to remove flickers and the changed conditions can be directly applied to the video obtainment. Therefore, the controlling method according to the present application can improve a quality of a currently obtained video dynamically in real time.

Furthermore, according to the detailed description of the invention, the controlling method is described in association with a moving image and is further applicable to the obtainment of a still image (i.e., photo) without substantial modifications. For instance, by performing the obtaining, detecting, adjusting and removing steps S10, S20, S20 and S60 once, it is able to adjust the corresponding conditions for the quality improvement of a still image obtained next time. Moreover, by performing the detecting, adjusting and removing steps S20, S30 and S60 in the first place, a further improved still image can be obtained following the obtaining step S10.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A smart device, comprising:
   a camera comprising a lens and an iris positioned over the lens, the iris comprising a multitude of films disposed concentrically in a same plane,
   wherein the multitude of films form a plurality of apertures such that each film has a respectively corresponding one of the plurality of apertures, each of the plurality of apertures having a different size, and
   wherein the iris is configured to adjust transparency of each film individually to form a different aperture; and
   a controller configured to cause the iris to adjust a size of an aperture formed in a corresponding one of the films to adjust quantity of light incident on the lens,
   wherein the iris further comprises a multitude of electrodes that are connected to the multitude of films, each of the electrodes being configured to apply voltage to a respectively corresponding one of the films, and
   wherein each of the films is discontinuous at at least one spot to be connected to a respectively corresponding one of the electrodes that is configured to apply the voltage to the corresponding film.

2. The smart device of claim 1, wherein the iris is configured to adjust the size of the aperture by partially adjusting transparency of the corresponding film.

3. The smart device of claim 2, wherein the iris is further configured to adjust the transparency of the corresponding film by partially changing a color of the corresponding film.

4. The smart device of claim 1, wherein the film is formed of an electronic material that switches from a transparent state to a non-transparent state when the voltage is applied to the film.

5. The smart device of claim 1, wherein the film comprises PEDOT (poly(3,4-ethylenedioxythiophene)) or $LiCF_3SO_3$.

6. The smart device of claim 1, wherein:
   the multitude of the films comprise at least one pair of films that are disposed adjacent to each other;
   one of the at least one pair of films is disposed within an aperture of the other one of the at least one pair of films; and
   the aperture of the other one of the at least one pair of films is greater in size than an aperture of the one of the at least one pair of films.

7. The smart device of claim 1, wherein the iris is configured to discolor each of the films selectively by electricity to adjust transparency of a corresponding one of the films.

8. The smart device of claim 1, wherein the iris is configured to:
transparentize films to form a predetermined aperture, the films that are transparentized having apertures that are smaller in size than the predetermined aperture; and
non-transparentize a film including the predetermined aperture and films having apertures that are greater in size than the predetermined aperture.

9. The smart device of claim 1, wherein the films comprise:
a first film including a first aperture having a first diameter; and
a second film configured to enclose the first film, the second film including a second aperture having a second diameter that is greater than the first diameter.

10. The smart device of claim 1, wherein:
each of the multitude of films is formed in a circular shape or in a substantially circular shape;
each of the multitude of films has a parenthesis shape; or
the multitude of films are formed to extend spirally.

11. The smart device of claim 1, wherein the electrodes, which are disposed in a same plane, are spaced apart from each other by a prescribed gap.

12. The smart device of claim 1, wherein the electrodes are sequentially stacked on each other.

13. The smart device of claim 1, wherein:
the films have inner circumferences forming the plurality of apertures and outer circumferences, each of the inner circumferences being spaced apart from a respectively corresponding one of the outer circumferences; and
a distance between the inner circumferences and the outer circumferences is 0.001~0.27 mm.

14. The smart device of claim 1, wherein the iris further comprises:
a non-transparent layer enclosing an outer circumference of the film, wherein the non-transparent layer is configured to cut off the light from entering the lens; and
a substrate having the film formed thereon, wherein the substrate is formed of a transparent material.

15. The smart device of claim 1, wherein:
$Ka$ indicates a diameter of the aperture and $Ks$ indicates a diagonal length of an image sensor configured to convert optical information of the light having passed through the lens into an electrical signal; and
a rate ($Ka/Ks$) of the diameter of the aperture over the diagonal length of the image sensor is $0.05<|Ka/Ks|<0.2$.

16. The smart device of claim 1, wherein F-number of the camera is 1.4~3.5.

17. The smart device of claim 1, wherein a diameter of the lens is 0.46~1.17 mm.

* * * * *